(12) United States Patent
Grancharov et al.

(10) Patent No.: US 11,749,286 B2
(45) Date of Patent: *Sep. 5, 2023

(54) ASR TRAINING AND ADAPTATION

(71) Applicant: Telefonaktiebolaget LM Ericsson (publ), Stockholm (SE)

(72) Inventors: Volodya Grancharov, Solna (SE); Erlendur Karlsson, Uppsala (SE); Sigurdur Sverrisson, Kungsängen (SE); Maxim Teslenko, Sollentuna (SE); Konstantinos Vandikas, Solna (SE); Aneta Vulgarakis Feljan, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 17/542,808

(22) Filed: Dec. 6, 2021

(65) Prior Publication Data

US 2022/0093107 A1 Mar. 24, 2022

Related U.S. Application Data

(60) Continuation of application No. 17/217,044, filed on Mar. 30, 2021, now Pat. No. 11,610,590, which is a
(Continued)

(51) Int. Cl.
*G10L 17/04* (2013.01)
*G10L 17/06* (2013.01)
*G10L 17/00* (2013.01)

(52) U.S. Cl.
CPC .............. *G10L 17/04* (2013.01); *G10L 17/00* (2013.01); *G10L 17/06* (2013.01)

(58) Field of Classification Search
CPC ......... G10L 17/04; G10L 17/00; G10L 17/06; G10L 15/183; G10L 15/065
See application file for complete search history.

(56) References Cited

U.S. PATENT DOCUMENTS 6,332,122 B1  12/2001  Ortega et al.
6,442,519 B1  8/2002  Kanevsky et al.
(Continued)

OTHER PUBLICATIONS

International Search Report and Written Opinion of the International Searching Authority for PCT International Application No. PCT/SE2017/050457 dated Feb. 15, 2018.
(Continued)

*Primary Examiner* — Huyen X Vo
(74) *Attorney, Agent, or Firm* — SAGE PATENT GROUP

(57) ABSTRACT

AM and LM parameters to be used for adapting an ASR model are derived for each audio segment of an audio stream comprising multiple audio programs. A set of identifiers, including a speaker identifier, a speaker domain identifier and a program domain identifier, is obtained for each audio segment. The set of identifiers are used to select most suitable AM and LM parameters for the particular audio segment. The embodiments enable provision of maximum constraints on the AMs and LMs and enable adaptation of the ASR model on the fly for audio streams of multiple audio programs, such as broadcast audio. This means that the embodiments enable selecting AM and LM parameters that are most suitable in terms of ASR performance for each audio segment.

21 Claims, 12 Drawing Sheets

Related U.S. Application Data division of application No. 16/609,553, filed as application No. PCT/SE2017/050457 on May 8, 2017, now Pat. No. 10,984,801.

(56) References Cited

U.S. PATENT DOCUMENTS

| | | | |
|---|---|---|---|
| 2003/0191639 A1* | 10/2003 | Mazza | G10L 15/183 704/E15.044 |
| 2004/0249650 A1* | 12/2004 | Freedman | G06Q 30/0201 705/7.29 |
| 2011/0078717 A1* | 3/2011 | Drummond | H04N 21/4821 715/764 |
| 2011/0320197 A1 | 12/2011 | Conejero et al. | |
| 2014/0081643 A1 | 3/2014 | John et al. | |
| 2016/0140964 A1* | 5/2016 | Connell, II | G10L 15/07 704/231 |
| 2016/0217793 A1* | 7/2016 | Gorodetski | G10L 17/04 |
| 2018/0075877 A1* | 3/2018 | Cilingir | G11B 27/034 |

OTHER PUBLICATIONS

Miansikkaniemi, Andre; "Acoustic Model and Language Model Adaptation for a Mobile Dictation Service"; Master's Thesis, Aalto University, School of Science and Technology, Espoo, FI; Mar. 2, 2010, 87 pages.

* cited by examiner

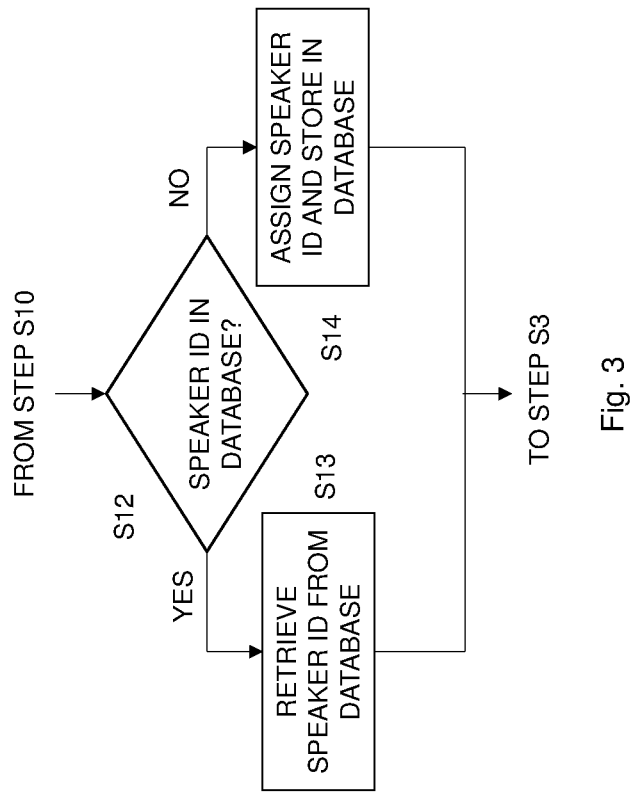
Fig. 3
Fig. 2
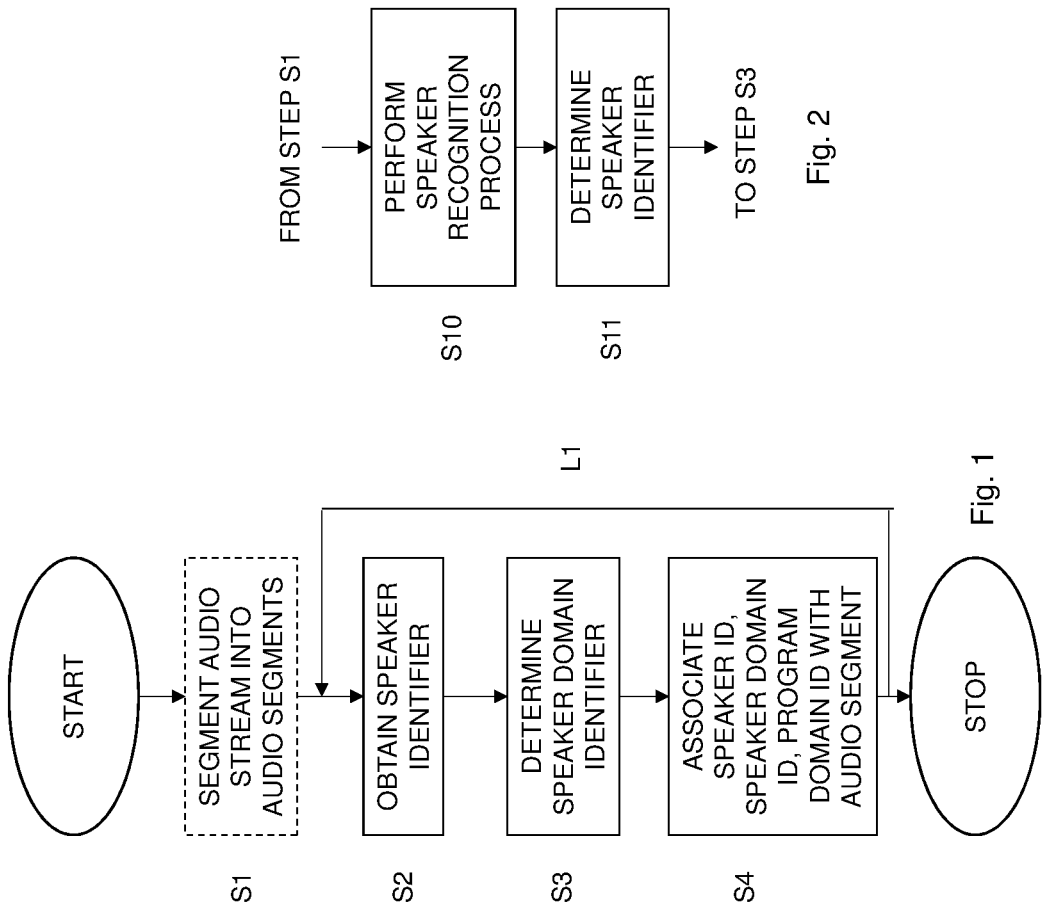
Fig. 1

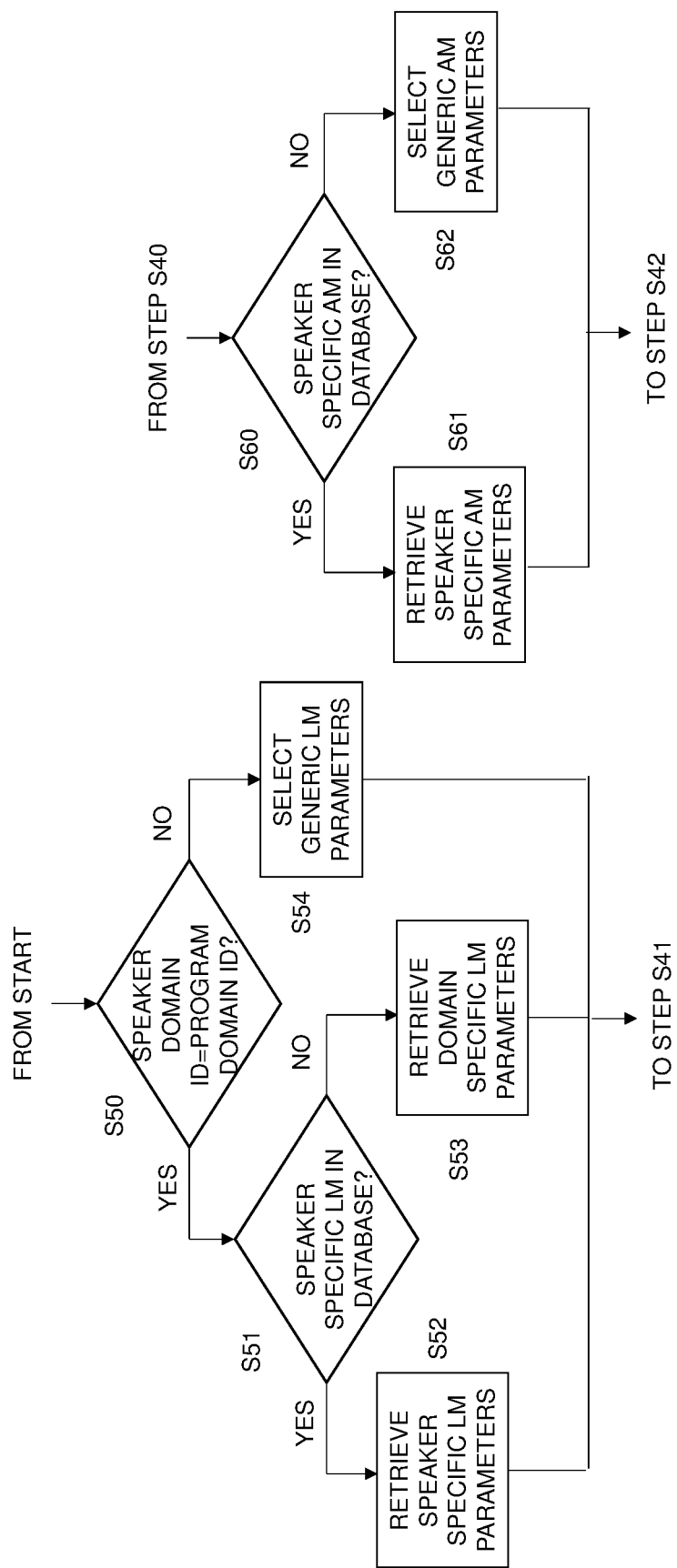

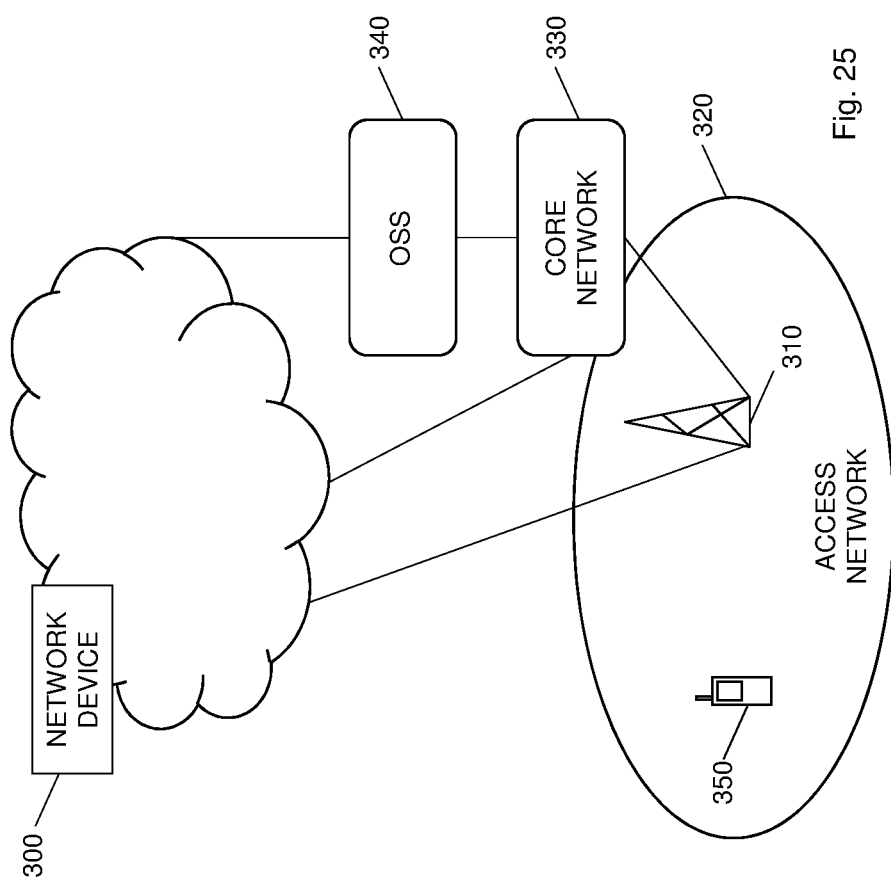

ASR TRAINING AND ADAPTATION

CROSS-REFERENCE TO RELATED APPLICATIONS

This application is a continuation of U.S. patent application Ser. No. 17/217,044, filed on Mar. 30, 2021, which is a divisional of U.S. patent application Ser. No. 16/609,553, filed on Oct. 30, 2019, now U.S. Pat. No. 10,984,801, which is a 35 U.S.C. § 371 national stage application of PCT International Application No. PCT/SE2017/050457, filed on May 8, 2017, the disclosures and contents of which are incorporated herein by reference in their entireties.

TECHNICAL FIELD

The present embodiments generally relate to automatic speech recognition (ASR), and in particular to training and adapting ASR systems or models to be used for audio streams with multiple audio programs and multiple speakers.

BACKGROUND

ASR, also referred to as speech recognition (SR), computer speech recognition or simply speech to text (STT), is the machine- or computer-based method of converting speech into readable text, typically in real time.

ASR systems are generally classified as speaker independent ASR systems or speaker dependent ASR systems. The latter ASR systems use ASR models trained for a given speaker and thereby fine tune the recognition of the enrolled speaker's speech and voice. Such ASR systems typically have relatively high accuracy but are mainly restricted to a single user case. This is in clear contrast to speaker independent ASR systems, which are invariant to the speaker. Speaker independent ASR systems generally have a lower accuracy as compared to speaker dependent ASR systems but are more flexible by allowing multiple users.

An ASR system uses an acoustic model (AM) and a language model (LM) in speech recognition. The AM represents the relationship between an audio signal and the phenomes or other linguistic units that make up the speech. Hence, an acoustic model is a statistical model that estimates the probability that a certain phoneme has been uttered in an audio segment. A language model is a probability distribution over sequences of words. In speech recognition, the ASR system tries to match sounds with word sequences. The language model provides context to distinguish between words and phrases that sound similar.

ASR systems are today used in, among others, computers and mobile telephones. ASR systems in computers are often used for dictation and/or to control the computer. The user will upfront speak to the computer and the ASR system, which is used by the ASR system to transcribe the speech into text or into control commands. On mobile phones, an ASR system is used to perform tasks on the mobile phone or to ask questions. In both application cases, the ASR system can often adapt the speaker independent AM as the user uses the ASR system.

There are, however, problems with the prior art ASR systems and solutions in transcribing audio streams comprising different audio programs and different speakers. The genre or topic may change many times and multiple speakers are present in the different audio programs. In such a situation, the accuracy of the ASR system may drop significantly as compared to a situation with a single speaker in a given topical context. A typical example of a multi-topic and multi-speaker situation is broadcasting audio and media.

There is therefore a need for improvements within the field of ASR and in particular for audio streams comprising multiple audio programs and multiple speakers.

SUMMARY

It is a general objective to enable an ASR adapted for audio streams comprising multiple audio programs and multiple speakers.

This and other objectives are met by embodiments as disclosed herein.

As aspect of the embodiments relates to an audio processing method for ASR. The method comprises obtaining, for each audio segment of multiple audio segments in an audio stream comprising audio data of multiple audio programs, each audio segment comprises speech of a single speaker, a speaker identifier of a speaker of the audio segment. The method also comprises determining, for each audio segment of the multiple audio segments, a speaker domain identifier for the audio segment based on a program domain identifier associated with the speaker identifier. The method further comprises associating, for each audio segment of the multiple audio segment, the speaker identifier, the speaker domain identifier and a program domain identifier with the audio segment to enable generation of ASR adaptation parameters based on the speaker identifier, the speaker domain identifier and the program domain identifier. The program domain identifier is associated with an audio program of the multiple audio programs and the audio segment comprises audio data of that audio program.

Another aspect of the embodiments relates to a method for generating ASR adaptation parameters. The method comprises selecting, for each audio segment of multiple audio segments in an audio stream comprising audio data of multiple audio programs, each audio segment comprises speech of a single speaker, LM parameters based on a comparison of i) a speaker domain identifier assigned to the audio segment based on a program domain identifier associated with a speaker of the audio segment and ii) a program domain identifier of an audio program of the multiple audio programs. The speaker has a speaker identifier and the audio segment comprises audio data of the audio program. The method also comprises associating, for each audio segment of the multiple audio segments, the LM parameters and AM parameters selected based on the speaker identifier with the audio segment to enable adaptation, based on the LM parameters and the AM parameters, of an ASR model used to transcribe the audio segment.

A further aspect of the embodiments relates to an ASR training method. The method comprises segmenting a transcribed audio stream comprising audio data of multiple audio programs into multiple transcribed audio segments. Each transcribed audio segment comprises speech of a single speaker. The method also comprises determining, for each transcribed audio segment of the multiple transcribed audio segments, speaker specific AM parameters and speaker specific LM parameters based on the transcribed audio segment of a speaker having a speaker identifier. The method further comprises determining, for each transcribed audio segment of the multiple audio segments and based on the transcribed audio segment, domain specific LM parameters of a program domain associated with a program domain identifier associated with an audio program of the multiple audio program. The transcribed audio segment then comprises audio data of this audio program. The method additionally comprises storing, for each transcribed audio segment of the multiple audio segments, the speaker specific AM parameters and the speaker specific LM parameters in at least one database together with the speaker identifier and storing the domain specific LM parameters in a database together with the program domain identifier.

An aspect of the embodiments relates to a device configured for audio processing for ASR. The device is configured to obtain, for each audio segment of multiple audio segments in an audio stream comprising audio data of multiple audio programs, each audio segment comprising speech of a single speaker, a speaker identifier of a speaker of the audio segment. The device is also configured to determine, for each audio segment of the multiple audio segments, a speaker domain identifier for the audio segment based on a program domain identifier associated with the speaker identifier. The device is further configured to associate, for each audio segment of the multiple audio segments, the speaker identifier, the speaker domain identifier and a program domain identifier with the audio segment to enable generation of ASR adaptation parameters based on the speaker identifier, the speaker domain identifier and the program domain identifier. The program domain identifier is associated with an audio program of the multiple audio programs and the audio segment comprises audio data of the audio program.

A related aspect of the embodiments defines a device configured for audio processing for ASR. The device comprises a speaker identifier obtaining module for obtaining, for each audio segment of multiple audio segments in an audio stream comprising audio data of multiple audio programs, each audio segment comprising speech of a single speaker, a speaker identifier of a speaker of the audio segment. The device also comprises a speaker domain identifier determining module for determining, for each audio segment of the multiple audio segments, a speaker domain identifier for the audio segment based on a program domain identifier associated with the speaker identifier. The device further comprises an associating module for associating, for each audio segment of the multiple audio segments, the speaker identifier, the speaker domain identifier and a program domain identifier with the audio segment to enable generation of ASR adaptation parameters based on the speaker identifier, the speaker domain identifier and the program domain identifier. The program domain identifier is associated with an audio program of the multiple audio programs and the audio segment comprises audio data of the audio program.

Another aspect of the embodiments relates to a device configured for generating ASR adaptation parameters. The device is configured to select, for each audio segment of multiple audio segments in an audio stream comprising audio data of multiple audio programs, each audio segment comprising speech of a single speaker, LM parameters based on a comparison of i) a speaker domain identifier assigned to the audio segment based on a program domain identifier associated with a speaker of the audio segment, the speaker having a speaker identifier, and ii) a program domain identifier of an audio program of the multiple audio programs. The audio segment comprises audio data of the audio program. The device is also configured to associate, for each audio segment of the multiple audio segments, the LM parameters and AM parameters selected based on the speaker domain identifier with the audio segment to enable adaptation, based on the LM parameters and the AM parameters, of an ASR model used to transcribe the audio segment.

A related aspect of the embodiments defines a device configured for generating ASR adaptation parameters. The device comprises a LM selecting module for selecting, for each audio segment of multiple audio segments in an audio stream comprising audio data of multiple audio programs, each audio segment comprising speech of a single speaker, LM parameters based on a comparison of i) a speaker domain identifier assigned to the audio segment based on a program domain identifier associated with a speaker of the audio segment, the speaker having a speaker identifier, and ii) a program domain identifier of an audio program of the multiple audio programs. The audio segment comprises audio data of the audio program. The device also comprises an associating module for associating, for each audio segment of the multiple audio segments, the LM parameters and AM parameters selected based on said speaker identifier with the audio segment to enable adaptation, based on the LM parameters and the AM parameters, of an ASR model used to transcribe the audio segment.

A further aspect of the embodiments relates to a device configured for ASR training. The device is configured to segment a transcribed audio stream comprising audio data of multiple audio programs into multiple transcribed audio segments. Each transcribed audio segment comprises speech of a single speaker. The device is also configured to determine, for each transcribed audio segment of the multiple transcribed audio segments, speaker specific AM parameters and speaker specific LM parameters based on the transcribed audio segment of a speaker having a speaker identifier. The device is further configured to determine, for each transcribed audio segment of the multiple transcribed audio segments and based on the transcribed audio segment, domain specific LM parameters of a program domain associated with a program domain identifier associated with an audio program of the multiple audio programs. The transcribed audio segment comprises audio data of the audio program. The device is additionally configured to store, for each transcribed audio segment of the multiple transcribed audio segments, the speaker specific AM parameters and the speaker specific LM parameters in at least one database together with the speaker identifier. The device is also configured to store, for each transcribed audio segment of the multiple transcribed audio segments, the domain specific LM parameters in a database together with the program domain identifier.

A related aspect of the embodiments defines a device configured for ASR training. The device comprises an audio segmenting module for segmenting a transcribed audio stream comprising audio data of multiple audio programs into multiple transcribed audio segments. Each transcribed audio segment comprises speech of a single speaker. The device also comprises an AM and LM determining module for determining, for each transcribed audio segment of the multiple transcribed audio segments, speaker specific AM parameters and speaker specific LM parameters based on the transcribed audio segment of a speaker having a speaker identifier. The device further comprises a LM determining module for determining, for each transcribed audio segment of the multiple transcribed audio segments and based on the transcribed audio segment, domain specific LM parameters of a program domain associated with a program domain identifier associated with an audio program of the multiple audio programs. The transcribed audio segment comprises audio data of the audio program. The device additionally comprises an AM and LM storing module for storing, for each transcribed audio segment of the multiple transcribed audio segments, the speaker specific AM parameters and the speaker specific LM parameters in at least one database together with the speaker identifier. The device also comprises a LM storing module for storing, for each transcribed audio segment of the multiple transcribed audio segments, the domain specific LM parameters in a database together with the program domain identifier.

An aspect of the embodiments relates to a computer program comprising instructions, which when executed by at least one processor, cause the at least one processor to obtain, for each audio segment of multiple audio segments in an audio stream comprising audio data of multiple audio programs, each audio segment comprising speech of a single speaker, a speaker identifier of a speaker of said audio segment. The at least one processor is also caused to determine, for each audio segment of the multiple audio segments, a speaker domain identifier for the audio segment based on a program domain identifier associated with the speaker identifier. The at least one processor is further caused to associate, for each audio segment of the multiple audio segments, the speaker identifier, the speaker domain identifier and a program domain identifier with the audio segment to enable generation of ASR adaptation parameters based on the speaker identifier, the speaker domain identifier and the program domain identifier. The program domain identifier is associated with an audio program of the multiple audio programs and the audio segment comprises audio data of the audio program.

Another aspect of the embodiments relates to a computer program comprising instructions, which when executed by at least one processor, cause the at least one processor to select, for each audio segment comprising speech of a single speaker of multiple audio segments in an audio stream comprising audio data of multiple audio programs, LM parameters based on a comparison of i) a speaker domain identifier assigned to the audio segment based on a program domain identifier associated with a speaker of the audio segment, the speaker having a speaker identifier, and ii) a program domain identifier of an audio program of the multiple audio programs. The audio segment comprises audio data of the audio program. The at least one processor is also caused to associate, for each audio segment of the multiple audio segments, the LM parameters and AM parameters selected based on the speaker identifier with the audio segment to enable adaptation, based on the LM parameters and the AM parameters, of an ASR model used to transcribe the audio segment.

A further aspect of the embodiments relates to a computer program comprising instructions, which when executed by at least one processor, cause the at least one processor to segment a transcribed audio stream comprising audio data of multiple audio programs into multiple transcribed audio segments. Each transcribed audio segment comprises speech of a single speaker. The at least one processor is also caused to determine, for each transcribed audio segment of the multiple transcribed audio segments, speaker specific AM parameters and speaker specific LM parameters based on the transcribed audio segment of a speaker having a speaker identifier. The at least one processor is further caused to determine, for each transcribed audio segment of the multiple transcribed audio segments and based on the transcribed audio segment, domain specific LM parameters of a program domain associated with a program domain identifier associated with an audio program of the multiple audio programs. The transcribed audio segment comprises audio data of the audio program. The at least one processor is additionally caused to, for each transcribed audio segment of the multiple transcribed audio segments, store the speaker specific AM parameters and the speaker specific LM parameters in at least one database together with the speaker identifier and store the domain specific LM parameters in a database together with the program domain identifier.

A related aspect of the embodiments defines a carrier comprising a computer program according to any of the aspects above. The carrier is one of an electronic signal, an optical signal, an electromagnetic signal, a magnetic signal, an electric signal, a radio signal, a microwave signal, or a computer-readable storage medium.

The present embodiments provide a solution to implementing ASR for audio streams with multiple audio programs and multiple speakers, such as broadcast audio. The embodiments enable provision of maximum constraints on the acoustic and language models and enable adaptation of the ASR model, such as on the fly, for audio streams of multiple audio programs and multiple speakers. This means that the embodiments enable selecting AM and LM parameters that are most suitable in terms of ASR performance for each audio segment of the audio stream.

BRIEF DESCRIPTION OF THE DRAWINGS

The embodiments, together with further objects and advantages thereof, may best be understood by making reference to the following description taken together with the accompanying drawings, in which:

FIG. 1 is a flow chart illustrating an audio processing method for ASR according to an embodiment;

FIG. 2 is a flow chart illustrating an embodiment of determining speaker identifier in FIG. 1;

FIG. 3 is a flow chart illustrating an embodiment of determining speaker identifier in FIG. 2;

FIG. 7 is a flow chart illustrating an embodiment of selecting LM parameters in FIG. 6;

FIG. 8 is a flow chart illustrating an embodiment of selecting AM parameters in FIG. 6;

FIG. 25 is a schematic illustration of an example of a wireless communication system with one or more cloud-based network devices according to an embodiment.

DETAILED DESCRIPTION

Figure 6:
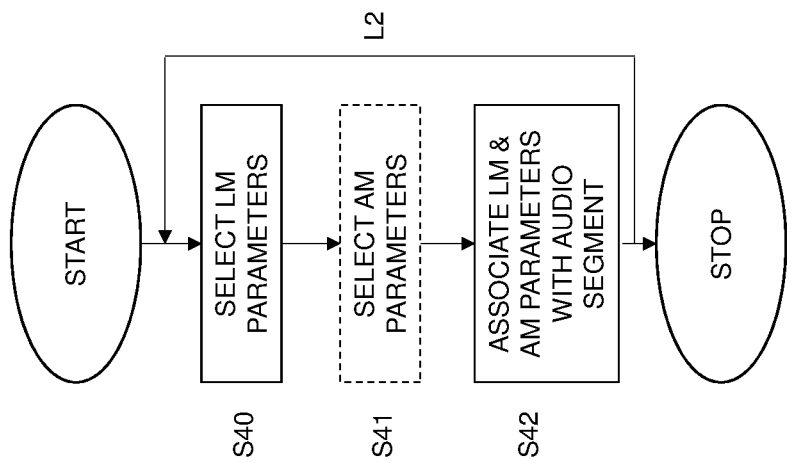
FIG. 6 is a flow chart illustrating a method for generating ASR adaptation parameters according to an embodiment.

Throughout the drawings, the same reference numbers are used for similar or corresponding elements.

The present embodiments generally relate to ASR, and in particular to training and adapting ASR systems or models to be used for audio streams with multiple audio programs and multiple speakers.

The present embodiments enable ASR systems and solutions in transcribing audio streams comprising different audio programs and different speakers. This is achieved by deriving or obtaining a set of identifiers for audio segments of the audio stream and where this set of identifiers is used to generate ASR adaptation parameters, in more detail AM and LM parameters, that can be used to adapt, preferably on the fly or in real time, an ASR system or model that is used to transcribe the audio segment.

As a consequence, the ASR system and the ASR model parameters thereof are adapted and updated for the particular audio segments. Hence, the embodiments can efficiently handle changes in audio programs and/or in speakers within the audio stream by generating appropriate ASR adaptation parameters for the different audio segments.

FIG. 1 is a flow chart illustrating an audio processing method for ASR according to an embodiment. The method comprises steps S2 to S4, which are performed for each audio segment of multiple audio segments in an audio stream as is schematically illustrated by the line L1. The audio stream comprises audio data of multiple audio programs. Each audio segment comprises speech of a single speaker.

Step S2 of FIG. 1 comprises obtaining a speaker identifier (SP-ID) of a speaker of the audio segment. A following step S3 comprises determining a speaker domain identifier (SD-ID) for the audio segment based on a program domain identifier associated with the speaker identifier. The speaker identifier, the speaker domain identifier and a program domain identifier (PD-ID) are associated with the audio segment in step S4 to enable generation of ASR adaptation parameters based on the speaker identifier, the speaker domain identifier and the program domain identifier. The program domain identifier is associated with an audio program of the multiple audio programs and the audio segment comprises audio data of that audio program.

In a particular embodiment, the method comprises obtaining, in step S2, the speaker identifier of the speaker of the audio segment. Step S3 comprises determining the speaker domain identifier for the audio segment based on a program domain identifier associated with the speaker identifier. The speaker identifier, the speaker domain identifier and the program domain identifier are associated with the audio segment in step S4. The program domain identifier is associated with an audio program of the multiple audio programs and the audio segment comprises audio data of that audio program.

Thus, the audio processing method of FIG. 1 provides a set of identifiers, i.e., SP-ID, SD-ID and PD-ID, for each audio segment of the audio stream. The set of identifiers enables generation of ASR adaptation parameters that are used by an ASR system or model to transcribe the audio segment into a speech transcript. In more detail, and as is further described herein, the set of identifiers is used to determine AM and LM parameters that are to be used when adapting the ASR system or model in connection with transcribing the audio segment. The AM and LM parameters determined based on the set of identifiers thereby enable an adaptation of the ASR system or model to the particular audio segment. Accordingly, the accuracy in transcribing the audio segment will generally be increased by this adaptation as compared to using a generic or unconstrained ASR system or model that does not have its acoustic model and language model adapted for the audio segment to transcribe.

The set of identifiers comprises the SP-ID, which is an identifier of the speaker of the audio segment. Thus, speakers speaking during different audio segments of the audio stream have different assigned SP-IDs.

The set of identifiers also comprises the SD-ID, which is an identifier of the speaker domain for the audio segments. The SD-ID is, according to the embodiments, determined based on a program domain identifier associated with the speaker identifier. Thus, a SP-ID has an associated program domain identifier. In an embodiment, this associated program domain identifier identifies a program domain associated with the speaker identified by the speaker identifier.

A program domain as used herein represents a domain, genre or topic of an audio program. This means that audio programs can generally be divided or categorized into different program domains based on the genre or topic of the audio program. For instance, non-limiting examples of program domains could be news, sports, weather report, etc.

A program domain identifier associated with a speaker identifier thereby indicates the identifier of the program domain, in which the speaker identified by the speaker identifier is usually active and speaking. For instance, a news presenter is mostly active in news audio programs and is thereby typically associated with a program domain identifier assigned to the news domain.

The set of identifiers further comprises the PD-ID, which is an identifier of the program domain of an audio program. The current audio segment is then part of this audio program and thereby comprises audio data of this audio program. This means that the PD-ID identifies the program domain of the current audio program.

The SD-ID and PD-ID of the set of identifiers may be the same or may be different. In the former case, i.e., SD-ID=PD-ID, the current audio program is of a program domain in which the speaker is usually active. For instance, assume that the program domain identifier associated with the SP-ID indicates the news domain. In such a case, SD-ID will be an identifier of the news domain. Furthermore, assume that the current audio program is a news program. The PD-ID will then be an identifier of the news domain. Hence, SD-ID will be equal to PD-ID. In the latter case, i.e., SD-ID≠PD-ID, the current audio program is of a program domain different from the program domain in which the speaker is usually active. For instance, assume that the program domain identifier associated with the SP-ID indicates the news domain. In such a case, SD-ID will be an identifier of the news domain. Furthermore, assume that the current audio program is a weather report. The PD-ID will then be an identifier of the weather report domain. Hence, SD-ID will not be equal to PD-ID. This latter case typically happens when the speaker is out of his/her usual context and genre or topic.

The set of identifiers is associated with the audio segment in step S4. This association thereby provides a connection between the set of identifiers and the audio segment to indicate that the set of identifiers are determined or derived for the particular audio segment.

The association can be performed according to various embodiments. For instance, the set of identifiers could be sent together with the audio data of the audio segment in one or more data packets. In such a case, the association is achieved by the grouping of the set of identifiers and the audio data of the audio segment into the one or more data packets. Alternatively, the set of identifiers could be stored together with the audio data of the audio segment in a memory to thereby achieve the association in step S4. A further variant is to assign numbers or other types of identifiers to the audio segments. In such a case, this number or other type of identifier could then be associated with the set of identifiers to thereby achieve the association in step S4. For instance, $SP\text{-}ID_k$, $SD\text{-}ID_k$ and $PD\text{-}ID_k$ with the subscript "k" indicating the number of the current audio segment could be used to provide the association. Actually, any technology or method of associating the set of identifiers with the audio segment to enable identifying what set of identifiers to use for a given audio segment and/or for what audio segment that a current set of identifiers has been determined can be used according to the embodiments.

In an embodiment, the audio processing method comprises an additional step S1 as is shown in FIG. 1. This optional step S1 comprises segmenting the audio stream into the multiple audio segments. Step S1 comprises, in an embodiment, speaker diarizing the audio stream into audio segments comprising speech of a single speaker.

Speaker diarization is the process of partitioning an input audio stream into homogenous audio segments and further grouping those segments based on their similarity. A homogenous audio segment is an audio segment comprising speech of a single speaker. Generally, speaker diarization enhances the readability of an automatic speech transcription by structuring the audio stream into homogenous audio segments. Speaker diarization is a combination of speaker segmentation and speaker clustering. Speaker segmentation aims at finding speaker change points in an audio stream, whereas speaker clustering aims at grouping together audio segments on the basis of speaker characteristics.

In speaker diarization one of the most popular methods is to use a Gaussian mixture model to model each of the speakers, and assign the corresponding audio frames for each speaker with the help of a hidden Markov model (HMM). There are two main kinds of clustering scenario. The first one is by far the most popular and is called Bottom-Up. The algorithm starts in splitting the full audio content in a succession of clusters and progressively tries to merge the redundant clusters in order to reach a situation where each cluster corresponds to a real speaker. The second clustering strategy is called Top-Down and starts with one single cluster for all the audio data and tries to split it iteratively until reaching a number of clusters equal to the number of speakers.

The different audio segments obtained in step S1 are then processed as described herein in the following steps S2 to S4 of FIG. 1.

In an embodiment, step S2 in FIG. 1 comprises receiving the speaker identifier, such as from a device, module, nodes or entity that determines the speaker identifier for the current audio segment. In such a case, the determination of the speaker identifier in step S2 and the determination of speaker domain identifier in step S3 may take place at different places, such as at different devices, modules, nodes or entities.

FIG. 2 is a flow chart illustrating another embodiment of step S2 in FIG. 1. This embodiment comprises step S10, which comprises performing a speaker recognition process on the audio segment to determine a speaker model of the speaker. A next step S11 comprises determining the speaker identifier based on the speaker model. The method then continues to step S3 in FIG. 1.

Speaker recognition, also referred to as voice recognition, is the identification of a speaker from characteristics of voices. Speaker recognition uses the acoustic features of speech, i.e., a so-called speaker model, that have been found to differ between individuals. The speaker model reflects both anatomy, e.g., size and shape of the vocal tract, and learned behavioral patterns, e.g., voice pitch, speaking style. A speaker recognition process is a pattern recognition process. The various technologies used to process and store voice prints include frequency estimation, hidden Markov models, Gaussian mixture models, pattern matching algorithms, neural networks, matrix representation, vector quantization and decision trees.

Thus, performing a speaker recognition process in step S10 preferably comprises determining or estimating a speaker model of the speaker, i.e., deriving the above mentioned acoustic features of speech. The speaker model is then used to determine the speaker identifier in step S11.

FIG. 3 is a flow chart illustrating a particular embodiment of step S11 in FIG. 2. In this embodiment, the speaker identifier is retrieved in step S13 from a database based on the speaker model if the database comprises the speaker identifier. However, if the database does not comprise the speaker identifier the method comprises assigning, in step S14, a speaker identifier of the speaker and storing the speaker identifier and the speaker model in the database.

In an embodiment, an optional step S12 investigates whether there is a speaker identifier for the current speaker in the database. This step S12 is preferably performed by investigating whether there is a speaker model in the database that matches or corresponds to the speaker model determined in step S10. If the database comprises a speaker model that matches the speaker model determined in step S10, the method continues to step S13. Step S13 then comprises retrieving, from the database, the speaker identifier that is associated with the speaker model that matched the speaker model determined in step S10. In this case, the database thereby already comprises speaker model and speaker identifier of the current speaker. Hence, such speaker model and speaker identifier have previously determined and stored in the database, such as during a training stage or at a previous stage in the processing of the current or a previous audio stream.

If the database does not comprise the speaker model as concluded in step S12, the method then continues to step S14. In this case, no speaker identifier has previously been assigned to the current speaker. Accordingly, a new speaker identifier is assigned to the speaker in step S14 and the speaker identifier is stored together with the speaker model in the database. This means that the speaker identifier will then be available in the database for a subsequent audio segment of the audio stream or another audio stream comprising speech of the current speaker.

Figure 4:
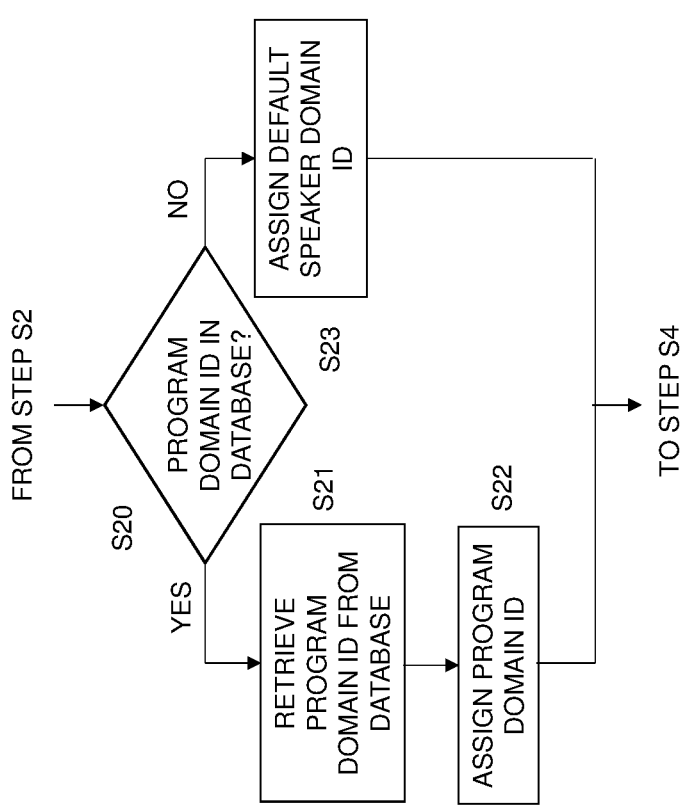
FIG. 4 is a flow chart illustrating an embodiment of obtaining speaker domain identifier in FIG. 1.

FIG. 4 is a flow chart illustrating an embodiment of step S3 in FIG. 1. This embodiment comprises retrieving, in step S21 and based on the speaker identifier, the program domain identifier associated with the speaker from a database storing program domain identifiers for different speakers with a respective speaker identifier if the database comprises a program domain identifier for the speaker identifier. The method also comprises, in this embodiment, assigning the program domain identifier associated with the speaker as speaker domain identifier. However, if the database does not comprise the program domain identifier for the speaker the method instead continues to step S23.

Step S23 comprises, in an embodiment, assigning a default speaker domain identifier to the audio segment. In another embodiment, step S23 comprises assigning, to the audio segment, a speaker domain identifier selected or identified based on information or metadata associated with the audio program.

In an embodiment, optional step S20 comprises checking or verifying whether the database comprises a program domain identifier for the speaker identifier as determined in step S2 in FIG. 1. If the database comprises such a program domain identifier the method continues to step S21, otherwise the method continues to step S23. Step S21 retrieves the program domain identifier stored in the database for the speaker identifier and then assigns the retrieved program domain identifier as speaker domain identifier in step S22.

If the database does not comprise a stored program domain identifier for the speaker identifier either a default speaker domain identifier is assigned as speaker domain identifier or a speaker domain identifier is selected based on information or metadata associated with the audio program.

In the former case, i.e., default speaker domain identifier, a default speaker domain identifier is used. This default speaker domain identifier thereby indicates that the current speaker as identified by the speaker identifier has not previously been assigned a program domain identifier identifying a program domain in which the speaker has been active. This can be the case when a new speaker is identified for an audio stream and thereby no speaker model nor program domain identifier has been determined for the speaker and stored in database(s).

In the latter case, information or metadata associated with the audio program is used to select a speaker domain identifier in step S23 and assign the selected speaker domain identifier to the audio segment. An example of such information or metadata could be the time of day at which the audio program was sent. For instance, certain audio programs are scheduled at predefined times of day, for instance news could take place at each hour of the day, weather reports could be scheduled at 5 minutes past each hour, etc. In such a case, the time of day of the audio program could be used to identify the likely program domain or genre of the audio program and thereby assign the program domain identifier of this program domain as speaker domain identifier in step S23. Correspondingly, the name or title of the audio program could be used to identify the likely program domain or genre of the audio program. For instance, if the title includes the word "news" or "weather" the program domain is determined by the "news" or "weather report".

The method then continues for step S22 or S23 to step S4 in FIG. 1.

The database used in FIG. 4 could be a same database as used in FIG. 3 or a different database.

Figure 5:
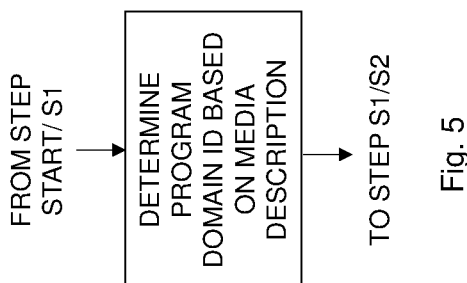
FIG. 5 is a flow chart illustrating an additional, optional step of the method shown in FIG. 1 according to an embodiment.

FIG. 5 is a flow chart illustrating an additional, optional step S30 of the method shown in FIG. 1. The method starts in step S30 or continues from the optional step S1 to step S30. This step S30 comprises determining the program domain identifier associated with the audio program based on a media description of the audio program. The method then continues to step S1 or S2 in FIG. 1.

Hence, in this embodiment, the program domain identifier of the audio program is determined based on a media description. In a first embodiment, the media description comprises the program domain identifier. In such a case, step S30 preferably comprises retrieving the program domain identifier from the media description. In a second embodiment, the media description comprises information that can be used to determine the program domain identifier. This information could, for instance, include program domain or genre information of the audio program, title of audio program, etc. In such a case, this information in the media description is used to determine the program domain identifier, such as by selecting the identifier of the program domain or genre based on the program domain information in the media description or by selecting the identifier of the program domain identified based on the title of the audio program in the media description.

The media description could be any information or data element comprising information and metadata of the audio program. A non-limiting, but illustrative, example of such a media description is a Session Description Protocol (SDP) message.

An example of an SDP message originating from user Alice at an IPv4 address is presented below. Additional meta data can be found therein, such as the name of the speaker, as mentioned previously, the title, a short description of the session, a URL describing the session and other details related to the codecs that are being used. Moreover, the "a" field can be used to provide even further information.

v=0
o=alice 45234252352 253452345345 IN IP4 10.0.0.2
s=BBC News
i=BBC's 9 o'clock news
u=www.bbc.co.uk
e=alice@scima.com (Alice Scima)
c=IN IP4 192.168.2.6/127
t=45234252352 253452345345
a=recvonly
m=audio 49170 RTP/AVP 0
m=video 51372 RTP/AVP 99
a=rtpmap:99 h263-1998/90000

FIG. 6 is a flow chart illustrating a method for generating ASR adaptation parameters according to an embodiment. The method comprises steps S40 and S42 and optionally step S41, which are performed for each audio segment of multiple audio segments in an audio stream as schematically illustrated by the line L2 in FIG. 6. The audio stream comprises audio data of multiple audio programs. Each audio segment comprises speech of a single speaker.

Step S40 comprises selecting LM parameters based on a comparison of i) a speaker domain identifier assigned to the audio segment based on a program domain identifier associated with a speaker of the audio segment and ii) a program domain identifier of an audio program of the multiple audio programs. The speaker has a speaker identifier and the audio segment comprises audio data of the audio program. The LM parameters and AM parameters, selected based on the speaker identifier, are then associated in step S42 with the audio segment to enable adaptation, based on the LM parameters and the AM parameters, of an ASR model used to transcribe the audio segment.

In an embodiment, the method also comprises step S41. This step S41 comprises selecting the AM parameters based on the speaker identifier.

In another embodiment, step S41 comprises receiving or otherwise obtaining the AM parameters selected on the speaker identifier. In this embodiment, steps S40 and S41 may be performed at different places, such as at different devices, modules, nodes or entities.

In the method shown in FIG. 6, steps S40 and S41 can be performed serially in any order or at least partly in parallel.

Thus, the set of identifiers as determined or derived in FIG. 1 is used in the method of FIG. 6 to select AM and LM parameters for the current audio segment. These selected AM and LM parameters enable adaptation of an ASR model used to transcribe the audio segment into a speech transcript.

The LM parameters are selected in step S40 based on a comparison of SD-ID and PD-ID of the set of identifiers and the AM parameters are optionally selected in step S41 based on SP-ID of the set of identifiers.

The association of the LM and AM parameters with the audio segment in step S42 could be performed according to various embodiments as previously described in connection with step S4 in FIG. 1. For instance, the LM and AM parameters could be sent together with the audio data of the audio segment in one or more data packets or the LM and AM parameters could be stored together with the audio data of the audio segment in a memory. Alternatively, or in addition, the LM and AM parameters could be associated with a number or identifier of the audio segment, such as $LM_k$ and $AM_k$.

In an embodiment, step S40 comprises retrieving, based on the comparison, the LM parameters from a database storing speaker specific LM parameters for different speakers with a respective speaker identifier and domain specific LM parameters for different program domains with a respective domain identifier.

FIG. 7 is a flow chart illustrating a particular embodiment of step S40. This particular embodiment comprises retrieving, in step S52 and from the database and if the speaker domain identifier is equal to the program domain identifier of the audio program, speaker specific LM parameters associated with the speaker identifier if the database comprises speaker specific LM parameters. However, if the database does not comprise such speaker specific LM parameters the method instead comprises retrieving, in step S53 and from the database and if the speaker domain identifier is equal to the program domain identifier of the audio program, domain specific LM parameters associated with the speaker domain identifier. If the speaker domain identifier is not equal to the program domain identifier of the audio program the method instead comprises selecting generic LM parameters in step S54.

In an embodiment, the method comprises the optional step S50, which comprises comparing the speaker domain identifier and the program domain identifier of the audio program. If SD-ID=PD-ID, the method continues to step S51 and otherwise, i.e., SD-ID≠PD-ID, the method continues to step S54. The optional step S51 comprises checking or verifying whether the database comprises speaker specific LM parameters. If the database comprises such speaker specific LM parameters the method continues to step S52, otherwise it continues to step S53.

The speaker specific LM parameters enable adaptation of the language model of the ASR model to the particular speaker of the audio segment. Such speaker specific adaptation of the language model generally increases the accuracy of transcribing the audio segment as compared to using a speaker independent and context independent language model, generally denoted unconstrained or generic language model.

Figure 14:
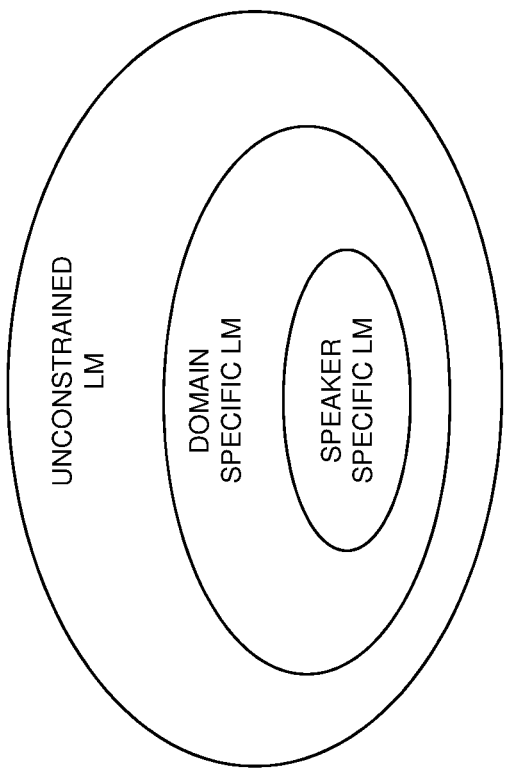

This concept is schematically illustrated in FIG. 14. The highest accuracy during transcribing is generally achieved when using a speaker specific language model. In such a case, the language model is adapted to the particular speaker and the words and phrases that he/she generally uses. Different speakers generally have their own vocabulary and thereby use different words and phrases. A speaker specific language model adapted to the speaker's vocabulary increases the chances of predicting correct words during transcription of an audio segment.

A next level, typically resulting in less accuracy, is to use a domain specific language model. In such a case, the language model is adapted to the particular program domain, genre or topic of the audio program. Generally, words and phrases spoken during an audio program are often dependent on the context, i.e., of the topic or genre of the audio program. For instance, words and expressions describing the weather are more likely to occur in a weather report as compared to during a sport program.

The highest level is an unconstrained or generic language model. Such a unconstrained language model is not adapted to either a particular speaker's vocabulary or to a particular context, topic or genre. This generally results in lower accuracy during transcription as compared to domain specific or speaker specific language models.

Figure 15:
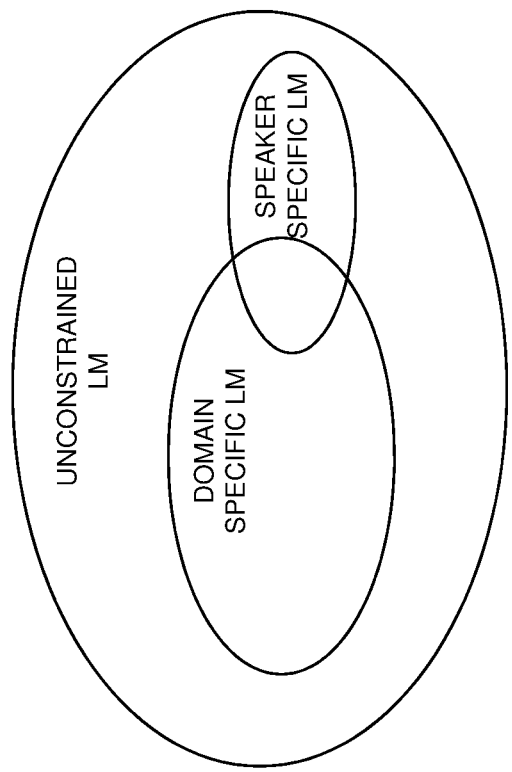

FIG. 15 illustrates another variant of this concept. As shown in FIG. 15, the speaker specific language model may at least partly overlap a domain specific language model. This is possible if the speaker is for instance active in several program domains. For instance, the speaker could mostly be employed as a news presenter but may also appear in other types of audio programs with varying topics and thereby varying genres and program domains. In such an example, the domain specific language model shown in FIG. 15 could represent a language model specific for the news domain.

Step S52 in FIG. 7 retrieves the speaker specific LM parameters if SD-ID=PD-ID and if the database comprises the speaker specific LM parameters. In this case, the speaker is speaking within the program domain in which he/she is usually speaking. Accordingly, speaker specific LM parameters adapted based on the vocabulary of the speaker within this program domain would generally provide the highest accuracy if used by an ASR model.

However, if there are no speaker specific LM parameters in the database, domain specific LM parameters are instead retrieved from the database. Such domain specific LM parameters are adapted to the vocabulary of the current program domain, and are thereby adapted to the current context and topic of the audio program.

If SD-ID≠PD-ID, the speaker is speaking in an audio program that belongs to a program domain that is different from the program domain in which he/she is usually speaking. In such a case, the speaker specific LM parameters would generally not be appropriate since they are adapted to the speaker's vocabulary within another context or program domain. In addition, the domain specific LM parameters associated with speaker domain identifier are not suitable since the program domain identified by the speaker domain identifier is different from the program domain of the current audio program as defined by the program domain identifier.

The generic LM parameters selected in step S54 are unconstrained LM parameters that could be the default language model of the ASR model. Hence, no adaptation of the language model of the ASR model based on the particular speaker or the particular program domain is then performed in this case.

The database storing the speaker and domain specific LM parameters could be the same database as used in FIG. 4, a same database as used in FIG. 3 or a different database.

In an embodiment, step S41 of FIG. 6 comprises retrieving, based on the speaker identifier, the AM parameters from a database storing speaker specific AM parameters for different speakers with a respective speaker identifier.

FIG. 8 is a flow chart illustrating a particular embodiment of step S41. This particular embodiment comprises retrieving, in step S61 and from the database, speaker specific AM parameters associated with the speaker identifier if the database comprises speaker specific AM parameters associated with the speaker identifier. However, if the database does not comprise speaker specific AM parameters associated with the speaker identifier the method comprises selecting generic AM parameters in step S62.

In an embodiment, the method comprises the optional step S60, which comprises checking or verifying whether the database comprises speaker specific AM parameters associated with the speaker identifier. If the database comprises such speaker specific AM parameters the method continues to step S61, otherwise it continues to step S62.

The speaker specific AM parameters enable adaptation of the acoustic model of the ASR model to the particular speaker of the audio segment. Such speaker specific adaptation of the acoustic model generally increases the accuracy of transcribing the audio segment as compared to using a speaker independent and context independent language model, generally denoted unconstrained or generic acoustic model.

Figure 13:
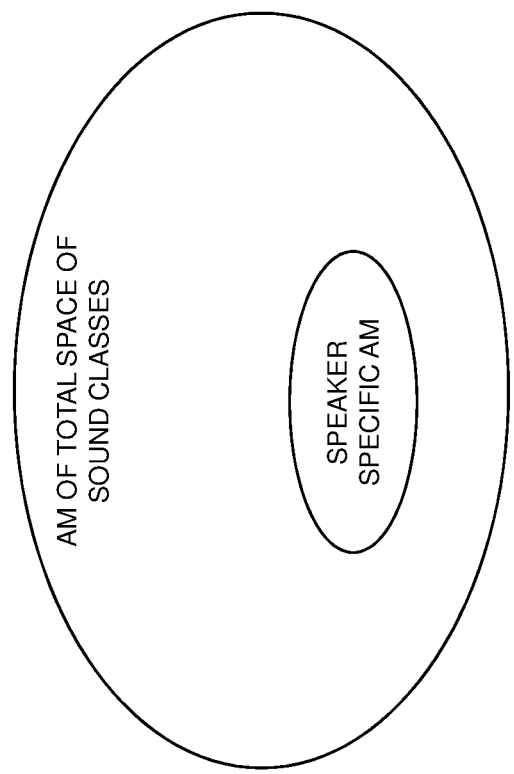
FIGS. 13-15 schematically illustrate the concept of unconstrained and constrained AM and LM models in ASR.

This concept is generally illustrated in FIG. 13. The highest accuracy during transcription is generally achieved when using a speaker specific acoustic model. In such a case, the acoustic model is adapted to the particular speaker and his/her anatomy, e.g., size and shape of the vocal tract, and learned behavioral patterns, e.g., voice pitch, speaking style. Different speakers generally pronounce words and phonemes differently. A speaker specific acoustic model adapted to the speaker increases the chances of predicting phonemes during transcription of an audio segment.

The highest level is an unconstrained or generic acoustic model. This generic acoustic model is basically an acoustic model of the total space of sound classes. Such unconstrained acoustic model is not adapted to a particular speaker. This generally results in lower accuracy during transcription as compared to a speaker specific acoustic model.

Step S61 of FIG. 8 comprises retrieving the speaker specific AM parameters from the database if there are any such speaker specific AM parameters for the speaker identifier. If not, generic AM parameters are instead selected in step S62. The generic AM parameters selected in step S62 are unconstrained AM parameters that could be the default acoustic model of the ASR model. Hence, no adaptation of the acoustic model of the ASR model based on the particular speaker is then performed in this case.

The database storing the speaker specific AM parameters could be a same database as used in FIG. 7, i.e., storing speaker and domain specific LM parameters, a same database as used in FIG. 4, a same database as used in FIG. 3 or a different database.

The generic LM parameters selected in step S54 and/or the generic AM parameters selected in step S62 are, in an embodiment, retrieved from the database. In such a case, the database used in FIG. 7 comprises speaker and domain specific LM parameters and generic LM parameters. Furthermore, or alternatively, the database used in FIG. 8 comprises speaker specific AM parameters and generic AM parameters.

Figure 9:
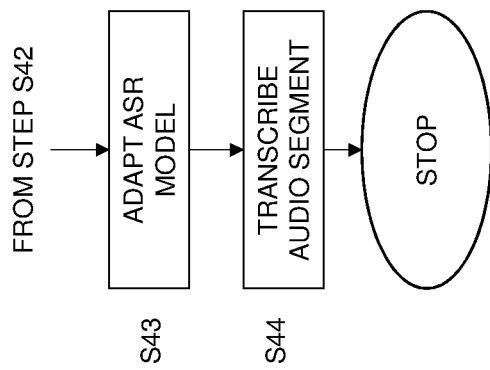
FIG. 9 is a flow chart illustrating additional, optional steps of the method shown in FIG. 6 according to an embodiment.

FIG. 9 is a flow chart illustrating additional, optional steps of the method shown in FIG. 6 according to an embodiment. In this embodiment, the method continues from step S42 in FIG. 6. A next step S43 comprises adapting the ASR model based on the selected LM parameters and the AM parameters to form an updated ASR model. The audio segment is then transcribed in the adapted ASR model in step S44 into a speech transcript.

Thus, the LM and AM parameters as obtained in the method illustrated in FIG. 6 and discussed in the foregoing are used to adapt the ASR model. Accordingly, the language model of the ASR model is adapted or updated based on the LM parameters and the acoustic model of the ASR model is adapted or updated based on the AM parameters. The resulting adapted ASR model is thereby adapted to transcribe the current audio segment with a high accuracy into a speech transcript.

The adaptation in step S43 thereby adapts or updates a generic or default ASR model to have language and acoustic models that are adapted for current audio segment. This adaptation generally results in higher transcription accuracy as compared to using the generic or default ASR model without any adaptation to the current audio segment.

This means that the embodiments provide sets of LM and AM parameters for different audio segments in an audio stream of multiple audio programs. These sets of LM and AM parameters enable, when used to adapt the ASR model, transcription of the audio segments using an ASR model that is adapted for each particular audio segment. Thus, different audio segments of the audio stream may have different sets of LM and AM parameters as determined according to the embodiments. When implemented in the ASR model the different sets of LM and AM parameters will thereby adapt the ASR model differently and in dependency of the particular characteristics of the audio segments. Such an adaptation of the ASR model for an audio stream of different audio programs have not been possible with the prior art technology.

Figure 10:
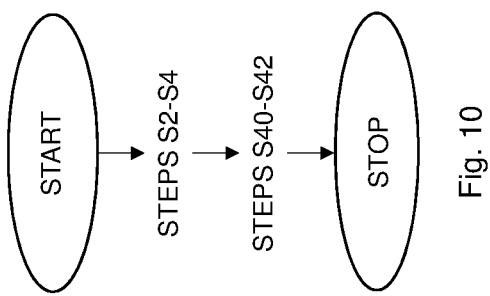
FIG. 10 is a flow chart illustrating additional, optional steps of the method shown in FIG. 6 according to another embodiment.

FIG. 10 is a flow chart illustrating an embodiment basically combining the method steps of FIG. 1 with the method steps of FIG. 6. Hence, in this embodiment steps S2 to S4 in FIG. 1 and steps S40 to S42 in FIG. 6 are preferably performed for each audio segment of the multiple audio segments.

Hence, in this embodiment, a speaker identifier of a speaker of the audio segment is obtained in step S2. A speaker domain identifier is determined in step S3 for the audio segment based on a program domain identifier associated with the speaker identifier. The speaker identifier, the speaker domain identifier and a program domain identifier associated with the audio program are associated with the audio segment in step S4. The method then continues to steps S40 and S42 of FIG. 6.

In an embodiment, the method comprises step S1 in FIG. 1 in addition to steps S2-S4 and S40-S42. This step S1 then comprises segmenting the audio stream comprising audio data of multiple audio programs into multiple audio segments. Each audio segment comprises speech of a single speaker.

Figure 11:
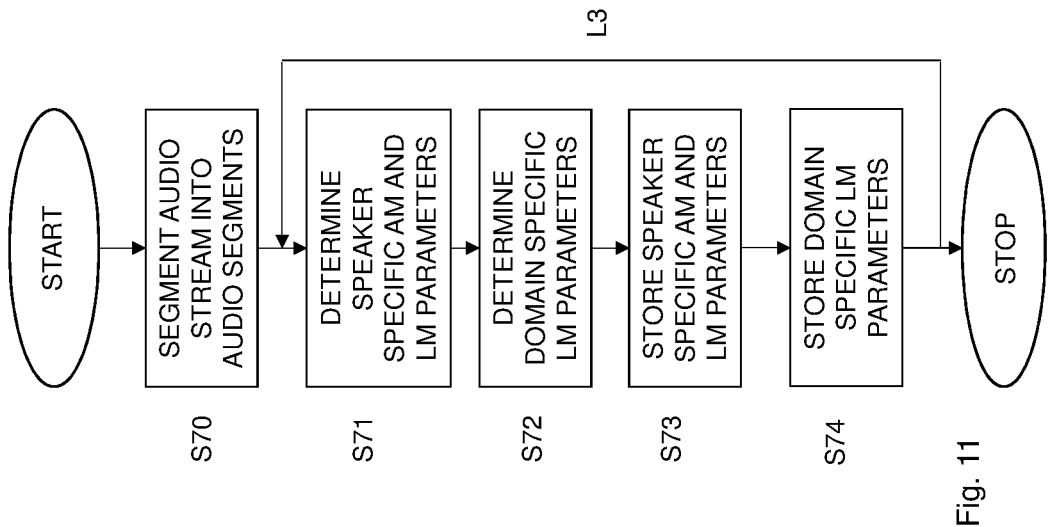
FIG. 11 is a flow chart illustrating an ASR training method according to an embodiment.

FIG. 11 is a flow chart illustrating an ASR training method according to an embodiment. The method comprises segmenting, in step S70, a transcribed audio stream comprising audio data of multiple audio programs into multiple transcribed audio segments. Each transcribed audio segment comprises speech of a single speaker. The following steps S71 to S74 of FIG. 11 are preferably performed for each transcribed audio segment of the multiple transcribed audio segments.

Step S71 comprises determining speaker specific AM parameters and speaker specific LM parameters based on the transcribed audio segment of a speaker having a speaker identifier. The method also comprises determining, in step S72 and based on the transcribed audio segment, domain specific LM parameters of a program domain associated with a program domain identifier associated with an audio program of the multiple audio programs. The transcribed audio segment then comprises audio data of this audio program. The speaker specific AM parameters and the speaker specific LM parameters are stored in at least one database together with the speaker identifier in step S73 and the domain specific LM parameters are stored in a database together with the program domain identifier in step S74.

Steps S73 and S74 could be performed serially in any order or at least partly in parallel. The two steps could, alternatively, be performed as a single method step.

The ASR training method uses transcribed audio segments as input to determine, update or adapt the speaker specific AM and LM parameters and the domain specific LM parameters. A transcribed audio segment is an audio segment together with the corresponding speech transcript or text. The parameters can thereby be determined in step S71 and S72 given the audio or speech data of the audio segment and the corresponding text of the speech in the audio segment.

An acoustic model is a statistical model that estimates the probability that a certain phoneme or sub-phoneme has been uttered in an audio segment. Non-limiting, but illustrative examples of such models include Gaussian mixture models (GMM), hidden Markov models (HMMs), neural networks with a softmax output layer, etc. Different methods are used for doing speaker adaptation of these models. Examples of such methods are vocal tract length normalization (VTLN), maximum a posteriori (MAP) adaptation of HMM/GMM parameters, maximum likelihood linear regression (MLLR) of Gaussian parameters and weighted speaker cluster approaches, which use an interpolated model to represent the current speaker.

A language model is a statistical model that estimates the probabilities of a word following a short sequence of words. These are called n-grams, where a 1-gram gives the probability of a word without taking into consideration the previous word before it. A 2-gram gives the probability of a word given the previous word before it, a 3-gram gives the probability of a word given the two previous words before it, etc. Language models are adapted to different contexts by compiling n-gram models on text material from the different contexts. To obtain usable language models requires huge amounts of text material, especially for the higher order n-grams. When generating n-gram probabilities through the maximum likelihood estimates, the estimates for n-grams that are seen in the training text tend to be too high and the estimates for the n-grams that are not seen too low. This unbalance is often corrected by taking some probability mass from the seen events and redistribute it to all the unseen events. This is called language model smoothing. More information of AM and LM adaptation can be found in [1].

In an embodiment, there are no previously determined AM and LM parameters for the speaker associated with the speaker identifier in step S71, i.e., the at least one database does not contain any speaker specific AM and LM parameters associated with the speaker identifier. In such a case, step S71 comprises determining these speaker specific AM and LM parameters for the speaker having speaker identifier based on the transcribed audio segment. These speaker specific AM and LM parameters are then stored in the at least one database in step S73 together with the speaker identifier.

If speaker specific AM and/or LM parameters have already previously been determined for the speaker associated with the speaker identifier, then step S71 preferably comprises updating the speaker specific AM and/or LM parameters based on the transcribed audio segment. Hence, the already stored speaker specific AM and/or LM parameters are updated based on the current transcribed audio segment to obtain updated speaker specific AM and/or LM parameters. These updated speaker specific AM and/or LM parameters are then stored in the at least one database in step S73 together with the speaker identifier.

In an embodiment, the speaker specific AM and LM parameters determined in step S71 are stored in a single database together with the speaker identifier in step S73. This means that it is later possible to retrieve the speaker specific AM and LM parameters from the database using the speaker identifier. In another embodiment, the speaker specific AM parameters are stored together with the speaker identifier in a database in step S73 and the speaker specific LM parameters are stored together with the speaker identifier in another database in step S73.

The database in which the domain specific LM parameters are stored together with the program domain identifier could be the same or one of the database used in step S73 and mentioned above, or could be another database. In either case, the domain specific LM parameters can be retrieved from the database using the program domain identifier as input.

In an embodiment, there are no previously determined LM parameters for the program domain associated with the program domain identifier in step S72, i.e., the database does not contain any domain specific LM parameters associated with the program domain identifier. In such a case, step S72 comprises determining these domain specific LM parameters for the program domain associated with the program domain identifier and based on the transcribed audio segment. These domain specific LM parameters are then stored in the database in step S74 together with the program domain identifier.

If domain specific LM parameters have already previously been determined for the program domain associated with the program domain identifier, then step S72 preferably comprises updating the domain specific LM parameters based on the transcribed audio segment. Hence, the already stored domain specific LM parameters are updated based on the current transcribed audio segment to obtain updated domain specific LM parameters. These updated domain specific LM parameters are then stored in the database in step S74 together with the program domain identifier.

In an embodiment, step S72 of FIG. 11 comprises determining the domain specific LM parameters by aggregating speaker specific LM parameters belonging to the program domain identified by the program domain identifier.

This embodiment corresponds to the situation as illustrated in FIG. 14. Hence, the domain specific LM parameters are determined by aggregating speaker specific LM parameters of speakers active within the program domain identified by the program domain identifier. This could be determined by aggregating speaker specific LM parameters of speakers associated with a speaker domain identifier that is equal to the program domain identifier. The speaker domain identifier then identifies the program domain for the speaker.

The aggregation of speaker specific LM parameters belonging to a same program domain can be performed according to various embodiments. For instance, a simple averaging, possibly a weighted averaging of the speaker specific LM parameters could be used to derive the domain specific LM parameters. In the latter case, the weights could be determined based on some quality data of the respective speaker specific LM parameters or based on the amount or number of transcribed audio segments that has been used to determine the respective speaker specific LM parameters. In other words, good quality speaker specific LM parameters and speaker specific LM parameter determined based on many audio segments could be weighted higher as compared to poor quality speaker specific LM parameters and speaker specific LM parameters determined based on few audio segments. Alternatively, other techniques than simple averaging could be used to aggregate the speaker specific LM parameters, like linear and log-linear interpolation [1].

In an embodiment, step S70 comprises speaker diarizing the transcribed audio stream into transcribed audio segments comprising speech of a single speaker, i.e., into homogenous transcribed audio segments. This step S70 thereby basically corresponds to step S1 in FIG. 1 but operates on transcribed audio streams, whereas step S1 operates on audio streams that are to be transcribed.

Figure 12:
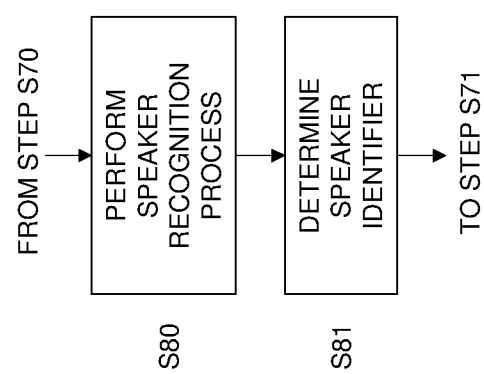
FIG. 12 is a flow chart illustrating additional, optional steps of the method shown in FIG. 11 according to an embodiment.

FIG. 12 is a flow chart illustrating additional, optional steps of the method shown in FIG. 11 according to an embodiment. This embodiment comprises performing a speaker recognition process on the transcribed audio segment to determine a speaker model of the speaker in step S80. A next step S81 comprises determining the speaker identifier based on the speaker model.

These steps S80 and S81 are basically performed as previously described in connection with FIG. 2. A difference is, though, that a transcribed audio segment is input to the speaker recognition process in step S80, whereas an audio segment to be transcribed is input to the speaker recognition process in step S10.

In a particular embodiment, step S81 of FIG. 12 is performed as disclosed in FIG. 3 and as previously described herein.

The present embodiments provide a solution to implementing ASR for audio streams with multiple audio programs and multiple speakers. A typical example of such a situation is broadcast media, such as broadcast audio. In the context of broadcast audio, there are multiple genres, i.e., program domains, and multiple frequently reappearing speakers, and it is generally desirable to impose maximum constrains on the acoustic and language models used by the ASR model or system. Generally, the more constraints on the acoustic and language models, the higher ASR performance since speaker specific acoustic and language models outperforms generic acoustic and language models and language models optimized for a particular program domain outperform general purpose or generic language models.

The embodiments thereby enable provision of maximum constraints on the acoustic and language models and enable adaptation of the ASR model on the fly for audio streams of multiple audio programs, such as broadcast audio. This means that the embodiments enable selecting AM and LM parameters that are most suitable in terms of ASR performance, i.e., speaker specific LM parameters over domain specific LM parameters, domain specific LM parameters over generic LM parameters and speaker specific AM parameters over generic AM parameters, for each audio segment and depending on the presence of such AM and LM parameters for different speakers and program domains.

Hence, embodiments as disclosed herein enable adaptation of the acoustic and language models of an ASR model or system on the fly also for audio streams of multiple audio programs and speakers, such as in the broadcast scenario.

An aspect of the embodiments relates to a device configured for audio processing for ASR. The device is configured to obtain, for each audio segment of multiple audio segments in an audio stream comprising audio data of multiple audio programs, each audio segment comprising speech of a single speaker, a speaker identifier of a speaker of the audio segment. The device is also configured to determine, for each audio segment of the multiple audio segments, a speaker domain identifier for the audio segment based on a program domain identifier associated with the speaker identifier. The device is further configured to associate, for each audio segment of the multiple audio segments, the speaker identifier, the speaker domain identifier and a program domain identifier with the audio segment to enable generation of ASR adaptation parameters based on the speaker identifier, the speaker domain identifier and the program domain identifier. The program domain identifier is associated with an audio program of the multiple audio programs and the audio segment comprises audio data of the audio program.

In an embodiment, the device is configured to segment the audio stream into the multiple audio segments.

In a particular embodiment, the device is configured to speaker diarize the audio stream into audio segments comprising speech of a single speaker.

In an embodiment, the device is configured to perform, for each audio segment of the multiple audio segments, a speaker recognition process on the audio segment to determine a speaker model of the speaker. The device is also configured to determine, for each audio segment of the multiple audio segments, the speaker identifier based on the speaker model.

In another embodiment, the device is configured to receive, for each audio segment of the multiple audio segments, the speaker identifier.

In a particular embodiment, the device is configured to retrieve, for each audio segment of the multiple audio segments, the speaker identifier from a database based on the speaker model if the database comprises the speaker identifier. The device is also configured to assign, for each audio segment of the multiple audio segments and if the database does not comprise the speaker identifier, a speaker identifier of the speaker and store the speaker identifier and the speaker model in the database.

In an embodiment, the device is configured to retrieve, for each audio segment of the multiple audio segments and based on the speaker identifier, the program domain identifier associated with the speaker from a database storing program domain identifiers for different speakers with a respective speaker identifier if the database comprises a program domain identifier for the speaker identifier. The device is also configured to assign, for each audio segment of the multiple audio segments, the program domain identifier associated with the speaker as speaker domain identifier. The device is further configured to assign, for each audio segment of the multiple audio segments and if the database does not comprise the program domain identifier for the speaker identifier, a default speaker domain identifier to the audio segment.

In an embodiment, the device is configured to determine the program domain identifier associated with the audio program based on a media description of the audio program.

Another aspect of the embodiments relates to a device configured for generating ASR adaptation parameters. The device is configured to select, for each audio segment of multiple audio segments in an audio stream comprising audio data of multiple audio programs, each audio segment comprising speech of a single speaker, LM parameters based on a comparison of i) a speaker domain identifier assigned to the audio segment based on a program domain identifier associated with a speaker of the audio segment, the speaker having a speaker identifier, and ii) a program domain identifier of an audio program of the multiple audio programs. The audio segment comprises audio data of the audio program. The device is also configured to associate, for each audio segment of the multiple audio segments, the LM parameters and AM parameters, selected based on the speaker identifier, with the audio segment to enable adaptation, based on the LM parameters and the AM parameters, of an ASR model used to transcribe the audio segment.

In an embodiment, the device is configured to retrieve, for each audio segment of the multiple audio segments and based on the comparison, the LM parameters from a database storing speaker specific LM parameters for different speakers with a respective speaker identifier and domain specific LM parameters for different program domains with a respective program domain identifier.

In a particular embodiment, the device is configured to retrieve, for each audio segment of the multiple audio segments and from the database and if the speaker domain identifier is equal to the program domain identifier of the audio program, speaker specific LM parameters associated with the speaker identifier if the database comprises the speaker specific LM parameters. The device is also configured to retrieve, for each audio segment of the multiple audio segments and from the database and if the speaker domain identifier is equal to the program domain identifier of the audio program, domain specific LM parameters associated with the speaker domain identifier if the database does not comprise the speaker specific LM parameters. The device is further configured to select, for each audio segment of the multiple audio segments and if the speaker domain identifier is not equal to the program domain identifier of the audio program, generic LM parameters.

In a particular embodiment, the device is configured to retrieve the generic LM parameters from the database.

In an embodiment, the device is configured to select, for each audio segment of the multiple audio segments, the AM parameters based on the speaker identifier.

In an embodiment, the device is configured to retrieve, for each audio segment of the multiple audio segments and based on the speaker identifier, the AM parameters from a database storing speaker specific AM parameters for different speakers with a respective speaker identifier.

In a particular embodiment, the device is configured to retrieve, for each audio segment of the multiple audio segments and from the database, speaker specific AM parameters associated with the speaker identifier if the database comprises speaker specific AM parameters associated with the speaker identifier. The device is also configured to select, for each audio segment of the multiple audio segments, generic AM parameters if the database does not comprise the speaker specific AM parameters associated with the speaker identifier.

In a particular embodiment, the device is configured to retrieve the generic AM parameters from the database.

In an embodiment, the device is configured to adapt, for each audio segment of the multiple audio segments, the ASR model based on the selected LM parameters and the selected AM parameters to form an adapted ASR model. The device is also configured to transcribe, for each audio segment of the multiple audio segments, the audio segment in the adapted ASR model into a speech transcript.

In an embodiment, the device is configured to obtain, for each audio segment of the multiple audio segments, a speaker identifier of a speaker of the audio segment. The device is also configured to determine, for each audio segment of the multiple audio segments, a speaker domain identifier for the audio segment based on a program domain identifier associated with the speaker identifier. The device is further configured to associate, for each audio segment of the multiple audio segments, the speaker identifier, the speaker domain identifier and a program domain identifier associated with the audio program with the audio segment.

A further aspect of the embodiments relates to a device configured for ASR training. The device is configured to segment a transcribed audio stream comprising audio data of multiple audio programs into multiple transcribed audio segments. Each transcribed audio segment comprises speech of a single speaker. The device is also configured to determine, for each transcribed audio segment of the multiple transcribed audio segments, speaker specific AM parameters and speaker specific LM parameters based on the transcribed audio segment of a speaker having a speaker identifier. The device is further configured to determine, for each transcribed audio segment of the multiple transcribed audio segments and based on the transcribed audio segment, domain specific LM parameters of a program domain associated with a program domain identifier associated with an audio program of the multiple audio programs. The transcribed audio segment comprises audio data of the audio program. The device is additionally configured to store, for each transcribed audio segment of the multiple transcribed audio segments, the speaker specific AM parameters and the speaker specific LM parameters in at least one database together with the speaker identifier. The device is also configured to store, for each transcribed audio segment of the multiple transcribed audio segments, the domain specific LM parameters in a database together with the program domain identifier.

In an embodiment, the device is configured to determine, for each transcribed audio segment of the multiple transcribed audio segments, the domain specific LM parameters by aggregating speaker specific LM parameters belonging to the program domain identified by the program domain identifier.

In an embodiment, the device is configured to speaker diarize the transcribed audio stream into transcribed audio segments comprising speech of a single speaker.

In an embodiment, the device is configured to perform a speaker recognition process on the transcribed audio segment to determine a speaker model of the speaker. The device is also configured to determine the speaker identifier based on the speaker model.

Figure 16:
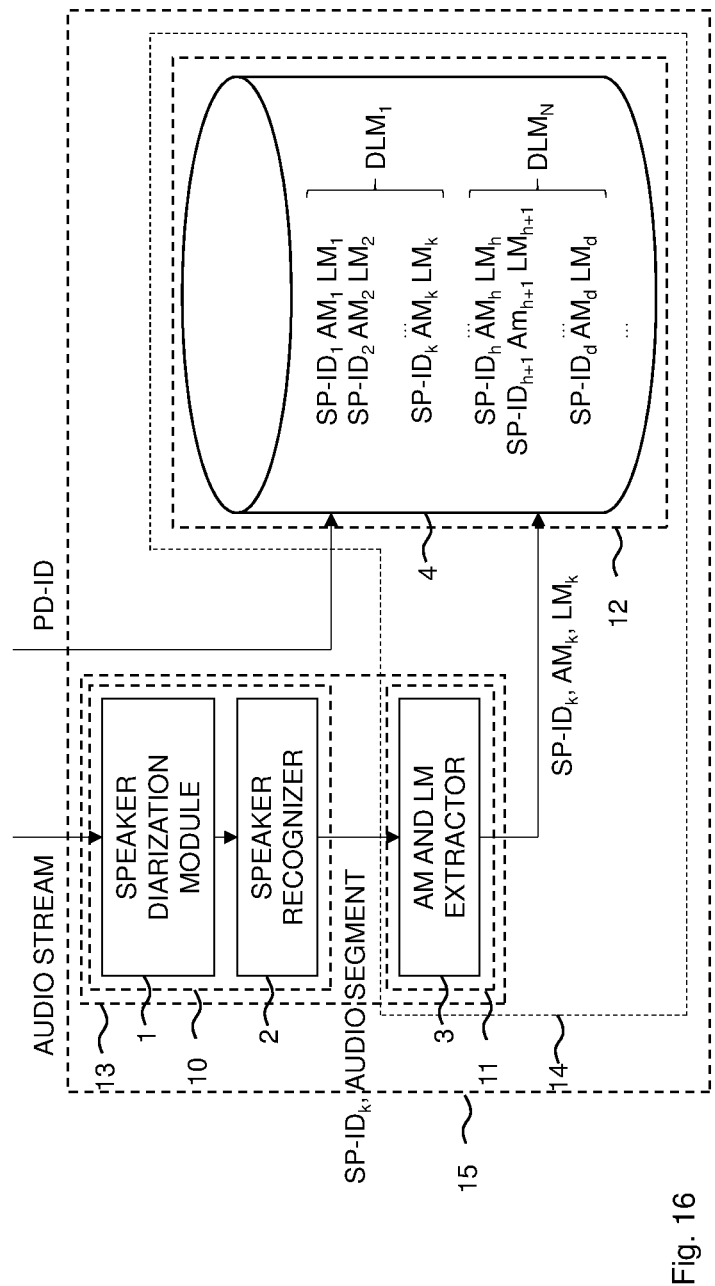
FIG. 16 is a schematic block diagram of the ASR training stage according to an embodiment.

FIG. 16 is a schematic block diagram of the ASR training stage according to an embodiment. As shown in the figure, a transcribed audio stream is input to a speaker diarization module 1 to segment the transcribed audio stream into homogenous transcribed audio segments. The transcribed audio segments are input to a speaker recognizer 2 that determines speaker identifier (SP-ID$_k$) for the transcribed audio segment. The figure also illustrates an AM and LM extractor 3 that determines speaker specific AM parameters (AM$_k$) and speaker specific LM parameters (LM$_k$) based on the transcribed audio segment. The speaker identifier is stored together with the speaker specific AM and LM parameters in a database 4 containing such speaker specific AM and LM parameters for different speakers having different speaker identifiers. The figure also shows domain specific LM parameters, such as built by aggregating speaker specific LM parameter for speakers belonging to a same program domain.

The program domain identifiers (PD-ID) of the audio programs of the transcribed audio stream are preferably retrieved from a media description of the audio programs and input into the database 4 together with the associated domain specific LM parameters.

For instance, in a training mode or stage, illustrated in FIG. 16, the ASR system is initialized with transcribed broadcast data, and then it continuously updates the AM and LM models of the ASR system, as new audio data arrives. The input transcribed broadcast data is first processed by a speaker diarization module 1, which detects speaker changes, and pools together different audio segments from the same speaker. Note that the actual speaker identity is not required, it is sufficient to assign different labels to different speakers. From the aggregated audio material that belongs to a particular speaker, AM and LM are trained. That is audio from speaker with speaker identifier (SP-ID) detected to be SP$_k$, which is done by the speaker recognizer 2, is used to generate models AM$_k$ and LM$_k$. These AM$_k$ and LM$_k$ models are stored in a database 4, and if this is not the first appearance of SP$_k$, the existing AM$_k$ and LM$_k$ models are updated, with weights proportional to the amount of new audio data relative to previously used audio data. Speakers that belong to the same program domain are grouped, and average domain language model (DLM) is built by aggregating individual speaker language models in that group.

FIG. 16 also illustrates various implementation solutions for the speaker diarization module 1, speaker recognizer 2, AM and LM extractor 3 and the database 4. For instance, the speaker diarization module 1 and the speaker recognizer 2 may be implemented together in a same entity, user equipment, network device or node 10. The AM and LM extractor 3 and database 4 could then be implemented in other entities, user equipment, network devices or nodes 11, 12. Such an implementation solution provides a most distributed implementation of the units involved in the ASR training. Alternatively, the speaker diarization module 1 and the speaker recognizer 2 could be implemented together with the AM and LM extractor 3 in a same entity, user equipment, network device or node 13. In another embodiment, the AM and LM extractor 3 is implemented in the same entity, user equipment, network device or node 14 as the database 4. A further variant is to have all the units, i.e., speaker diarization module 1, speaker recognizer 2 and AM and LM extractor 3, and the database 4 implemented in a same entity, user equipment, network device or node 15.

A user equipment as used herein could be any user equipment or device comprising functionality and units or modules as disclosed herein. Non-limiting, but illustrative, examples of such user devices include a computer, a laptop, a smart phone, a mobile telephone, a tablet, an audio player, a multimedia player, a set-top box, and a game console.

A network device is any device or functionality in a network. It is becoming increasingly popular to provide computing services, hardware and/or software, in network devices where the resources are delivered as a service to remote locations over a network. By way of example, this means that functionality, as described herein, can be distributed or re-located to one or more separate network devices in the form of physical devices, nodes or servers. The functionality may be re-located or distributed to one or more jointly acting physical and/or virtual machines that can be positioned in separate physical node(s), i.e., in the so-called cloud. This is sometimes also referred to as cloud computing, which is a model for enabling ubiquitous on-demand network access to a pool of configurable computing resources such as networks, servers, storage, applications and general or customized services.

A network node as used herein is any node or functionality of a communication network, including wired and wireless communication networks. For instance, a network node in wireless network could be an access node, a base station, a NodeB, an evolved NodeB (eNB), a next generation access node (NG AN), etc.

Figure 17:
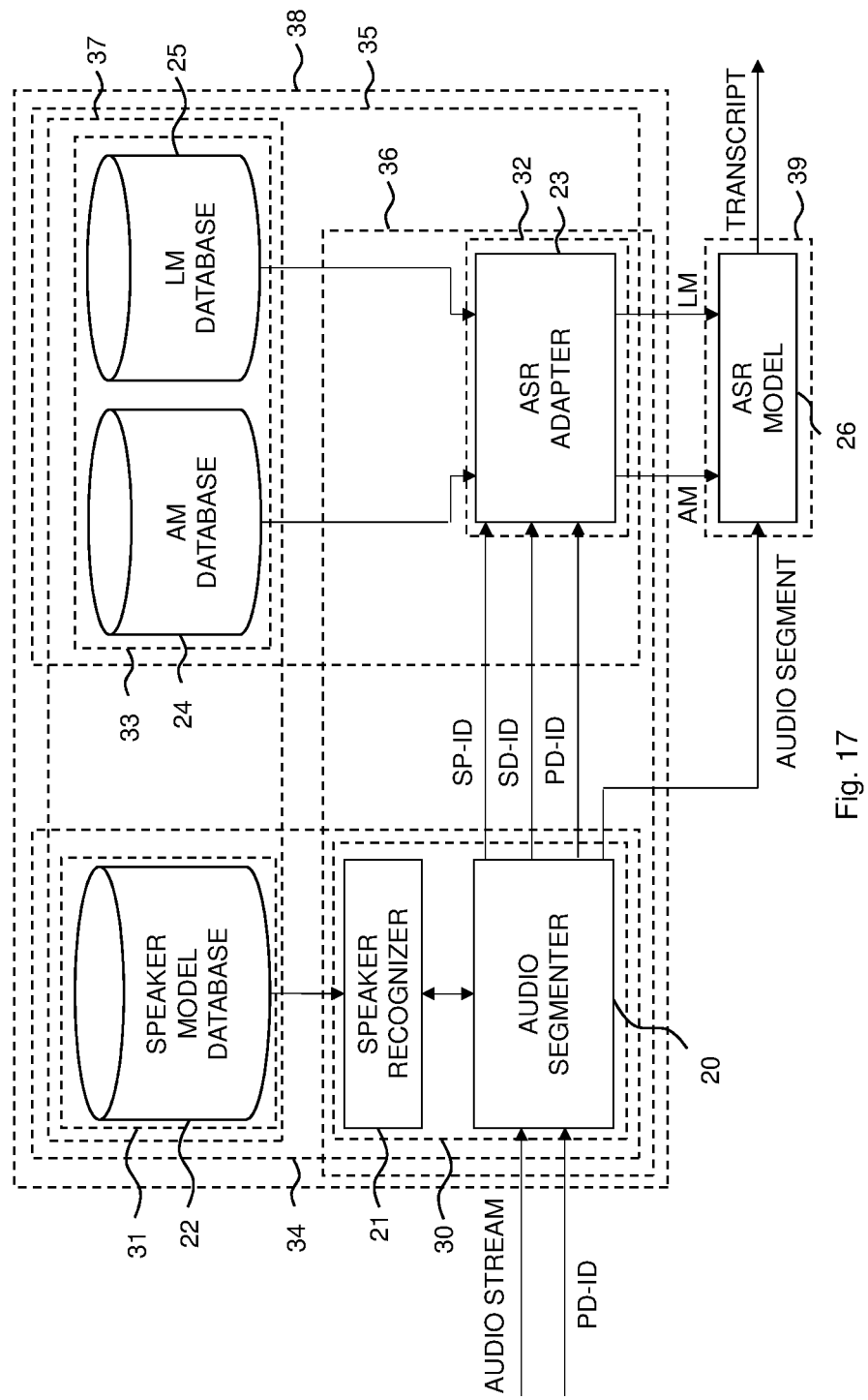
FIG. 17 is a schematic block diagram of the ASR-based transcribing stage according to an embodiment.

FIG. 17 is a schematic block diagram of the ASR-base transcribing stage according to an embodiment. An audio segmenter 20 receives an input audio stream and segments it into multiple audio segments. The audio segmenter 20 additionally receives program domain identifiers (PD-ID) of the audio programs in the audio stream, such as in the form of one or more media descriptions. The audio segmenter 20 forwards audio segments to a speaker recognizer 21 that determines speaker identifiers (SP-ID) of the speakers in the audio segments preferably based on speaker models and associated speaker identifiers stored in a database 22. The audio segmenter 20 thereby provides, preferably for each audio segment, a set of identifiers including the speaker identifier (SP-ID), the speaker domain identifier (SD-ID) and the program domain identifier (PD-ID). The set of identifiers are input to an ASR adapter 23 that determines AM and LM parameters based on the set of identifiers. The ASR adapter 23 preferably retrieves the AM and LM parameters using the set of identifiers from one or more databases 24, 25, represented by an AM database 24 and a LM database 25, in the figure. The determined AM and LM parameters are input to an ASR model 26 and therein used to adapt the ASR model in connection with transcribing, sometimes referred to as decoding, the audio segment from the audio segmenter 20 into a speech transcript.

Thus, the decoding or transcription mode is illustrated in FIG. 17. The first stage of that process involves segmenting the audio stream into audio segments where a single speaker is present. This processing stage delivers an audio segment along with the SP-ID, the PD-ID and the SD-ID. Note that PD-ID arrives with the broadcast data description, while SD-ID is preferably extracted from the database 22, as the program domain previously attached to this speaker. Thus, occasionally PD-ID and SD-ID could differ, if the speaker is out of his/her usual context. In the second stage of this transcription mode the AM and LM used in the ASR model 26 are first adapted by the ASR adapter 23 and once this is done the ASR is performed on the audio segment with the AM and LM parameters delivered by the ASR adapter 23.

In an embodiment, the adaptation of the AM and LM to the specific audio segment is defined by the following rules:

A) SP-ID is the speaker identifier of an enrolled speaker SP$_j$ and the SD-ID is the same as the PD-ID. Then the ASR adapter 23 delivers the speaker specific acoustic model, AM$_j$. If there exists a speaker specific language model for this speaker, $LM_j$, this is delivered, otherwise the domain specific language model, $DLM_j$, associated with the SD-ID is used.

B) SP-ID is the speaker identifier of an enrolled speaker $SP_p$, but there is a mismatch between the SD-ID and the PD-ID. Then, the acoustic model is updated to the speaker specific acoustic model, $AM_p$, but the language model chosen is as generic language model of the ASR model.

C) SP-ID is not the speaker identifier of an enrolled speaker. Then, the acoustic model chosen will be the generic acoustic model of the ASR model and the language model chosen will be the $DLM_q$ for the specific PD-ID.

Model adaptation could be performed also with external acoustic and language model databases. This is for example if a third party provides access to large database with enrolled speakers, or database with pre-computed domain specific language models (DLMs). In such scenario SP-ID and/or PD-ID are sent to the node with external databases, and the corresponding AM and/or LM are retrieved therefrom.

FIG. 17 also illustrates various implementation solutions for the audio segmenter 20, the speaker recognizer 21, the ASR adapter 23, the ASR model 26 and the databases 22, 24, 25. For instance, the audio segmenter 20 and the speaker recognizer 21 could be implemented in a same entity, user equipment, network device or network node 30. The ASR adapter 23 and the ASR model 26 could be implemented in respective entities, user equipment, network devices or network nodes 32, 39. The databases could also be implemented in separate entities, user equipment, network devices or network nodes or the speaker model database 22 is implemented in an entity, user equipment, network device or network node 31 and the AM database 24 and the LM database 25 are implemented together in an entity, user equipment, network device or network node 33. In this case, the AM and LM databases 24, 25 could be provided as separate databases or as a single database. Alternatively, the three databases 22, 24, 25 could be implemented as one, two or three databases in an entity, user equipment, network device or network node 37.

In an embodiment, the audio segmenter 20, the speaker recognizer 21 and the speaker model database 22 are implemented together in an entity, user equipment, network device or network node 34. Correspondingly, the ASR adapter 23 may be implemented together with the AM and LM databases 24, 25 in an entity, user equipment, network device or network node 35. A further variant is to have the audio segmenter 20, the speaker recognizer 21 and the ASR adapter 23 implemented together in an entity, user equipment, network device or network node 36, or indeed all unit 20, 21, 23 and databases 22, 24, 25 implemented in an entity, user equipment, network device or network node 38.

Thus, the embodiments encompass various unified or distributed implementations of the units or devices and databases as disclosed herein.

The database 4 as disclosed in FIG. 16 corresponds, in an embodiment, to the three databases 22, 24, 25 illustrated in FIG. 17. Thus, the three databases 22, 24, 25 could be regarded as the speaker model part, the AM part and the LM part of the database 4.

In an embodiment, the device configured for audio processing for ASR according to embodiments corresponds to or is implemented in the audio segmenter 20 in the FIG. 17 or the audio segmenter 20 and the speaker recognizer 21.

In an embodiment, the device configured for generating ASR adaptation parameters according to embodiments corresponds to or is implemented in the ASR adapter 23 of FIG. 17.

In an embodiment, the device configured for ASR training according to embodiments corresponds to or is implemented in AM and LM extractor 3 of FIG. 16 or in the AM and LM extractor 3 and the speaker recognizer 2, or in the AM and LM extractor 3, the speaker recognizer 2 and the speaker diarization module 1 of FIG. 16

It will be appreciated that the methods, method steps and devices, device functions described herein can be implemented, combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g., by reprogramming of the existing software or by adding new software components.

Figure 18:
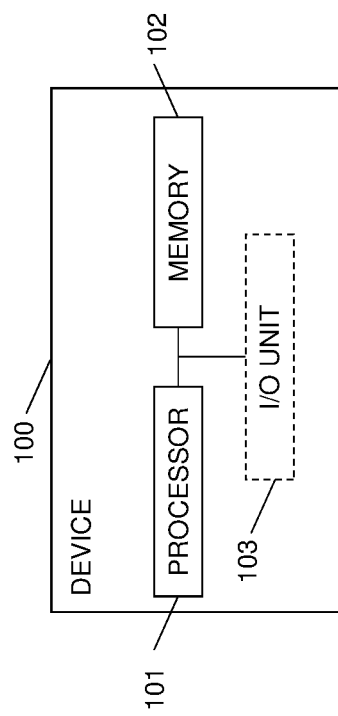
FIG. 18 is a schematic block diagram of a device according to an embodiment.

FIG. 18 is a schematic block diagram illustrating an example of a device 100 based on a processor-memory implementation according to an embodiment. In this particular example, the device 100 comprises a processor 101, such as processing circuitry, and a memory 102. The memory 102 comprises instructions executable by the processor 101.

In an embodiment, the processor 101 is operative to obtain the speaker identifier, determine the speaker domain identifier and associate the speaker identifier, the speaker domain identifier and the program domain identifier with the audio segment.

In another embodiment, the processor 101 is operative to select the LM parameters and associate the LM and AM parameters with the audio segment.

In a further embodiment, the processor 101 is operative to segment the transcribed audio stream and adapt the speaker specific AM and LM parameters and the domain specific LM parameters. The processor 101 is also operative to store the speaker specific AM and LM parameters and the domain specific LM parameters.

Optionally, the device 100 may also include a communication circuit, represented by an input/output (I/O) unit 103 in FIG. 18. The I/O unit 103 may include functions for wired and/or wireless communication with other devices and/or network nodes in a wired or wireless communication network. In a particular example, the I/O unit 103 may be based on radio circuitry for communication with one or more other nodes, including transmitting and/or receiving information. The I/O unit 103 may be interconnected to the processor 101 and/or memory 102. By way of example, the I/O unit 103 may include any of the following: a receiver, a transmitter, a transceiver, I/O circuitry, input port(s) and/or output port(s).

Figure 19:
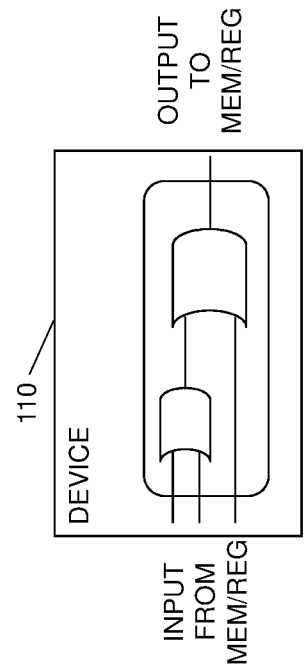
FIG. 19 is a schematic block diagram of a device according to another embodiment.

FIG. 19 is a schematic block diagram illustrating another example of a device 110 based on a hardware circuitry implementation according to an embodiment. Particular examples of suitable hardware circuitry include one or more suitably configured or possibly reconfigurable electronic circuitry, e.g., Application Specific Integrated Circuits (ASICs), FPGAs, or any other hardware logic such as circuits based on discrete logic gates and/or flip-flops interconnected to perform specialized functions in connection with suitable registers (REG), and/or memory units (MEM).

Figure 20:
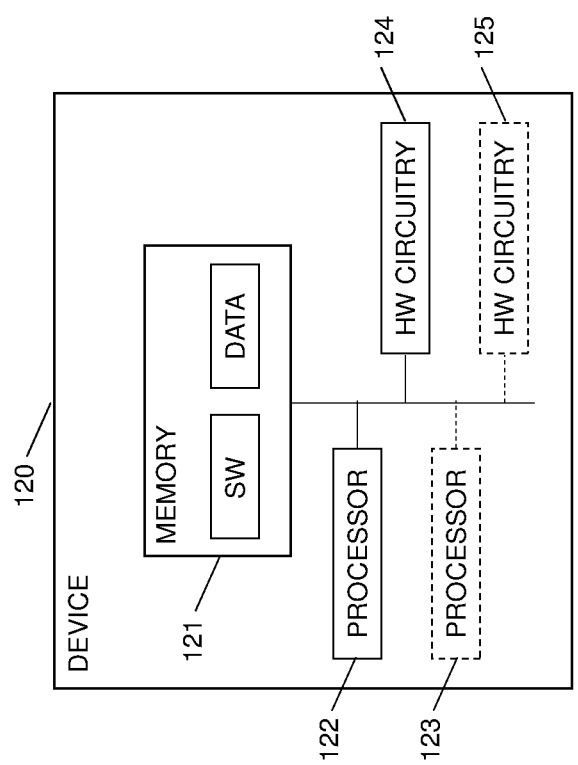
FIG. 20 is a schematic block diagram of a device according to a further embodiment.

FIG. 20 is a schematic block diagram illustrating yet another example of a device 120 based on combination of both processor(s) 122, 123 and hardware circuitry 124, 125 in connection with suitable memory unit(s) 121. The device 120 comprises one or more processors 122, 123, memory 121 including storage for software (SW) and data, and one or more units of hardware circuitry 124, 125. The overall functionality is thus partitioned between programmed software for execution on one or more processors 122, 123, and one or more pre-configured or possibly reconfigurable hardware circuits 124, 125. The actual hardware-software partitioning can be decided by a system designer based on a number of factors including processing speed, cost of implementation and other requirements.

Figure 21:
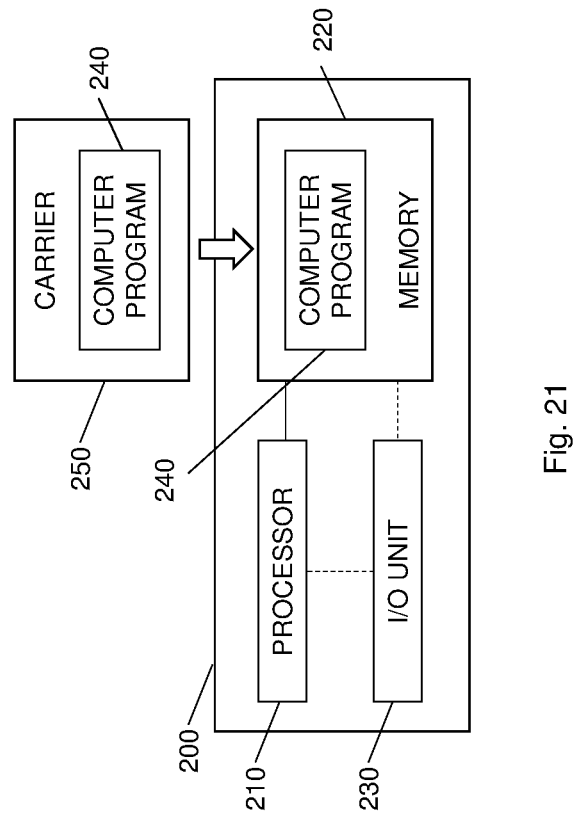
FIG. 21 is a schematic block diagram of a computer program based implementation of an embodiment.

FIG. 21 is a schematic diagram illustrating an example of a device 200 according to an embodiment. In this particular example, at least some of the steps, functions, procedures, modules and/or blocks described herein are implemented in a computer program 240, which is loaded into the memory 220 for execution by processing circuitry including one or more processors 210. The processor(s) 210 and memory 220 are interconnected to each other to enable normal software execution. An optional I/O unit 230 may also be interconnected to the processor(s) 210 and/or the memory 220 to enable input and/or output of relevant data, such as audio segments, transcribed audio segments, a transcribed audio stream, a set of identifiers, a speech transcript.

The term 'processor' should be interpreted in a general sense as any circuitry, system or device capable of executing program code or computer program instructions to perform a particular processing, determining or computing task.

The processing circuitry including one or more processors 210 is thus configured to perform, when executing the computer program 240, well-defined processing tasks such as those described herein.

The processing circuitry does not have to be dedicated to only execute the above-described steps, functions, procedure and/or blocks, but may also execute other tasks.

In a particular embodiment, the computer program 240 comprises instructions, which when executed by at least one processor 210, cause the at least one processor 210 to obtain, for each audio segment of multiple audio segments in an audio stream comprising audio data of multiple audio programs, each audio segment comprising speech of a single speaker, a speaker identifier of a speaker of said audio segment. The at least one processor 210 is also caused to determine, for each audio segment of the multiple audio segments, a speaker domain identifier for the audio segment based on a program domain identifier associated with the speaker identifier. The at least one processor 210 is further caused to associate, for each audio segment of the multiple audio segments, the speaker identifier, the speaker domain identifier and a program domain identifier with the audio segment to enable generation of ASR adaptation parameters based on the speaker identifier, the speaker domain identifier and the program domain identifier. The program domain identifier is associated with an audio program of the multiple audio programs, and the audio segment comprises audio data of the audio program.

In another particular embodiment, the computer program 240 comprises instructions, which when executed by at least one processor 210, cause the at least one processor 210 to select, for each audio segment comprising speech of a single speaker of multiple audio segments in an audio stream comprising audio data of multiple audio programs, LM parameters based on a comparison of i) a speaker domain identifier assigned to the audio segment based on a program domain identifier associated with a speaker of the audio segment, the speaker having a speaker identifier, and ii) a program domain identifier of an audio program of the multiple audio programs. The audio segment comprises audio data of the audio program. The at least one processor 210 is also caused to associate, for each audio segment of the multiple audio segments, the LM parameters and AM parameters, selected based on the speaker identifier, with the audio segment to enable adaptation, based on the LM parameters and the AM parameters, of an ASR model used to transcribe the audio segment.

In an embodiment, the at least one processor 210 is further caused to select, for each audio segment of the multiple audio segments, AM parameters based on the speaker identifier.

In a further particular embodiment, the computer program 240 comprises instructions, which when executed by at least one processor 210, cause the at least one processor 210 to segment a transcribed audio stream comprising audio data of multiple audio programs into multiple transcribed audio segments. Each transcribed audio segment comprises speech of a single speaker. The at least one processor 210 is also caused to determine, for each transcribed audio segment of the multiple transcribed audio segments, speaker specific AM parameters and speaker specific LM parameters based on the transcribed audio segment of a speaker having a speaker identifier. The at least one processor 210 is further caused to determine, for each transcribed audio segment of the multiple transcribed audio segments and based on the transcribed audio segment, domain specific LM parameters of a program domain associated with a program domain identifier associated with an audio program of the multiple audio programs. The transcribed audio segment comprises audio data of the audio program. The at least one processor 210 is additionally caused to, for each transcribed audio segment of the multiple transcribed audio segments, store the speaker specific AM parameters and the speaker specific LM parameters in at least one database together with the speaker identifier and store the domain specific LM parameters in a database together with the program domain identifier.

The proposed technology also provides a carrier 250 comprising the computer program 240. The carrier 250 is one of an electronic signal, an optical signal, an electromagnetic signal, a magnetic signal, an electric signal, a radio signal, a microwave signal, or a computer-readable storage medium.

By way of example, the software or computer program 240 may be realized as a computer program product, which is normally carried or stored on a computer-readable medium 250, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program 240 may thus be loaded into the operating memory 220 of a device 200 for execution by the processing circuitry 210 thereof.

The flow diagram or diagrams presented herein may be regarded as a computer flow diagram or diagrams, when performed by one or more processors. A corresponding device may be defined as a group of function modules, where each step performed by the processor corresponds to a function module. In this case, the function modules are implemented as a computer program running on the processor.

The computer program residing in memory may, thus, be organized as appropriate function modules configured to perform, when executed by the processor, at least part of the steps and/or tasks described herein.

Figure 22:
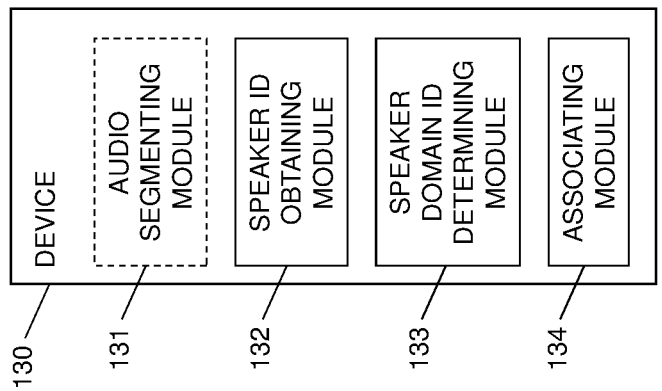
FIG. 22 is a schematic block diagram of a device configured for audio processing for ASR according to an embodiment.

FIG. 22 is a schematic block diagram of a device 130 configured for audio processing for ASR according to an embodiment. The device 130 comprises a speaker identifier obtaining module 132 for obtaining, for each audio segment of multiple audio segments in an audio stream comprising audio data of multiple audio programs, each audio segment comprising speech of a single speaker, a speaker identifier of a speaker of the audio segment. The device 130 also comprises a speaker domain identifier determining module 133 for determining, for each audio segment of the multiple audio segments, a speaker domain identifier for the audio segment based on a program domain identifier associated with the speaker identifier. The device 130 further comprises an associating module 134 for associating, for each audio segment of the multiple audio segments, the speaker identifier, the speaker domain identifier and a program domain identifier with the audio segment to enable generation of ASR adaptation parameters based on the speaker identifier, the speaker domain identifier and the program domain identifier. The program domain identifier is associated with an audio program of the multiple audio programs and the audio segment comprises audio data of the audio program.

In an embodiment, the device 130 optionally comprises an audio segmenting module 131 for segmenting the audio stream into the multiple audio segments.

Figure 23:
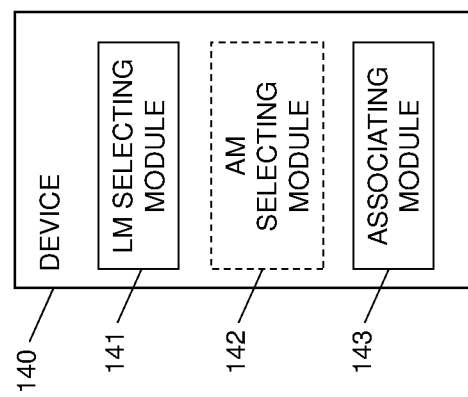
FIG. 23 is a schematic block diagram of a device configured for generating ASR adaptation parameters according to an embodiment.

FIG. 23 is a schematic block diagram of a device 140 configured for generating ASR adaptation parameters according to an embodiment. The device 140 comprises a LM selecting module 141 for selecting, for each audio segment of multiple audio segments in an audio stream comprising audio data of multiple audio programs, each audio segment comprising speech of a single speaker, LM parameters based on a comparison of i) a speaker domain identifier assigned to the audio segment based on a program domain identifier associated with a speaker of the audio segment, the speaker having a speaker identifier, and ii) a program domain identifier of an audio program of the multiple audio programs. The audio segment comprises audio data of the audio program. The device 140 also comprises an associating module 143 for associating, for each audio segment of the multiple audio segments, the LM parameters and AM parameters, selected based on the speaker identifier, with the audio segment to enable adaptation, based on the LM parameters and the AM parameters, of an ASR model used to transcribe the audio segment.

In an embodiment, the device 140 further comprises an AM selecting module 142 for selecting, for each audio segment of the multiple audio segments, AM parameters based on the speaker identifier.

Figure 24:
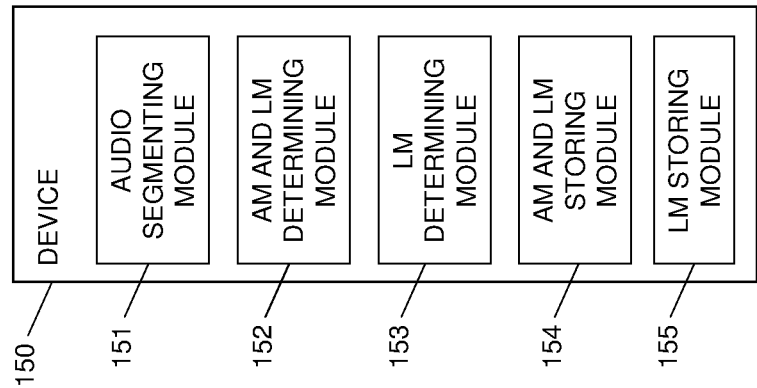
FIG. 24 is a schematic block diagram of a device configured for ASR training according to an embodiment.

FIG. 24 is a schematic block diagram of a device 150 configured for ASR training according to an embodiment. The device 150 comprises an audio segmenting module 151 for segmenting a transcribed audio stream comprising audio data of multiple audio programs into multiple transcribed audio segments. Each transcribed audio segment comprises speech of a single speaker. The device 150 also comprises an AM and LM determining module 152 for determining, for each transcribed audio segment of the multiple transcribed audio segments, speaker specific AM parameters and speaker specific LM parameters based on the transcribed audio segment of a speaker having a speaker identifier. The device 150 further comprises a LM determining module 153 for determining, for each transcribed audio segment of the multiple transcribed audio segments and based on the transcribed audio segment, domain specific LM parameters of a program domain associated with a program domain identifier associated with an audio program of the multiple audio programs. The transcribed audio segment comprises audio data of the audio program. The device 150 additionally comprises an AM and LM storing module 154 for storing, for each transcribed audio segment of the multiple transcribed audio segments, the speaker specific AM parameters and the speaker specific LM parameters in at least one database together with the speaker identifier. The device 150 also comprises a LM storing module 155 for storing, for each transcribed audio segment of the multiple transcribed audio segments, the domain specific LM parameters in a database together with the program domain identifier.

A further aspect of the embodiments relates to a user equipment comprising a device according to any of the embodiments, such as disclosed herein in connection with FIGS. 16 to 24. In an embodiment, the user equipment is selected from a group consisting of a computer, a laptop, a smart phone, a mobile phone, a tablet, an audio player, a multimedia player, a set-top box, and a game console.

Yet another aspect of the embodiments relates to a network node comprising a device according to any of the embodiments, such as disclosed herein in connection with FIGS. 16 to 24.

It is also becoming increasingly popular to provide computing services (hardware and/or software) in network devices, such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e., in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:
Consolidation of network functionality into virtualized software running on customized or generic hardware. This is sometimes referred to as network function virtualization.
Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centres, in other scenarios it may in fact be beneficial to distribute functionality over different parts of the network.

A network device may generally be seen as an electronic device being communicatively connected to other electronic devices in the network. By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use common off-the-shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g., wirelessly through a wireless network interface controller (WNIC) or through plugging in a cable to a physical port connected to a network interface controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may, for example, include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system, or a shim executing on a base operating system, that allows for the creation of multiple software containers that may each be used to execute one of a set of applications. In an example embodiment, each of the software containers, also called virtualization engines, virtual private servers, or jails, is a user space instance, typically a virtual memory space. These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor, sometimes referred to as a Virtual Machine Monitor (VMM), or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV)). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g., in a card or circuit board within a network device ND. In certain embodiments of such a hybrid network device, a platform Virtual Machine (VM), such as a VM that implements functionality of a special-purpose network device, could provide for para-virtualization to the hardware present in the hybrid network device.

FIG. 25 is a schematic diagram illustrating an example of a wireless communication network or system, including an access network 320 and a core network 320 and optionally an operations and support system (OSS) 340 in cooperation with one or more cloud-based network devices 300. The figure also illustrates a user equipment 350 connected to the access network 310 and capable of conducting wireless communication with a base station representing an embodiment of a network node 310.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

REFERENCES

[1] Mansikkaniemi, Acoustic Model and Language Model Adaptation for a Mobile Dictation Service, Master's thesis, Aalto University, 2010

The invention claimed is:

1. An audio processing method for automatic speech recognition, ASR, said method comprising:
for each audio segment of multiple audio segments in an audio stream comprising audio data of multiple audio programs, each audio segment comprising speech of a single speaker:
obtaining a speaker identifier of a speaker of said audio segment;
determining a program domain identifier based on a media description, wherein the media description could be any information or data element comprising information and metadata of the audio program; and
associating said speaker identifier, said program domain identifier and a speaker domain identifier with said audio segment to enable generation of ASR adaptation parameters based on said speaker identifier, said program domain identifier and said speaker domain identifier,
wherein said speaker domain identifier for said audio segment is based on information or metadata associated with an audio program of said multiple audio programs and said audio segment comprises audio data of said audio program.

2. The method according to claim 1, further comprising retrieving, based on said speaker identifier, acoustic mode (AM) parameters from a database storing speaker specific AM parameters for different speakers with a respective speaker identifier.

3. The method according to claim 2, wherein retrieving said AM parameters comprises:
retrieving, from said database, speaker specific AM parameters associated with said speaker identifier responsive to when said database comprises speaker specific AM parameters associated with said speaker identifier; and
otherwise selecting generic AM parameters.

4. The method according to claim 3, further comprises:
retrieving, for each audio segment of said multiple audio segments and from said database, speaker specific AM parameters associated with said speaker identifier responsive to when said database comprises speaker specific AM parameters associated with said speaker identifier; and
selecting, for each audio segment of said multiple audio segments, generic AM parameters responsive to when said database does not comprise said speaker specific AM parameters associated with said speaker identifier.

5. The method according to claim 1, further comprises:
selecting language model (LM) parameters based on comparison of the speaker domain identifier and the program domain identifier;
adapting, for each audio segment of said multiple audio segments, said ASR model based on said selected LM parameters to form an adapted ASR model; and
transcribing, for each audio segment of said multiple audio segments, said audio segment in said adapted ASR model into a speech transcript.

6. A device configured for audio processing for automatic speech recognition, ASR, the device comprising:
at least one processor; and
at least one memory storing program instructions executable by the at least one processor to operate to:
for each audio segment of multiple audio segments in an audio stream comprising audio data of multiple audio programs, each audio segment comprising speech of a single speaker:
obtaining a speaker identifier of a speaker of said audio segment;
determining a program domain identifier based on a media description, wherein the media description could be any information or data element comprising information and metadata of the audio program; and
associating said speaker identifier, said program domain identifier and a speaker domain identifier with said audio segment to enable generation of ASR adaptation parameters based on said speaker identifier, said program domain identifier and said speaker domain identifier,
wherein said speaker domain identifier for said audio segment is based on information or metadata associated with an audio program of said multiple audio programs and said audio segment comprises audio data of said audio program.

7. The device according to claim 6, wherein the instructions executable by the at least one processor further operate to:
retrieve, for each audio segment of said multiple audio segments and from said database and responsive to when said speaker domain identifier is equal to said program domain identifier of said audio program, speaker specific language model (LM) parameters associated with said speaker identifier responsive to when a database comprises said speaker specific LM parameters;
retrieve, for each audio segment of said multiple audio segments and responsive to when said speaker domain identifier is equal to said program domain identifier of said audio program, domain specific LM parameters associated with said speaker domain identifier responsive to when said database does not comprise said speaker specific LM parameters; and
select, for each audio segment of said multiple audio segments and responsive to when said speaker domain identifier is not equal to said program domain identifier of said audio program, generic LM parameters.

8. The device according to claim 6, wherein the instructions executable by the at least one processor further operate to select, for each audio segment of said multiple audio segments, acoustic mode (AM) parameters based on said speaker identifier.

9. The device according to claim 6, wherein the instructions executable by the at least one processor further operate to retrieve, for each audio segment of said multiple audio segments and based on said speaker identifier, acoustic mode (AM) parameters from a database storing speaker specific AM parameters for different speakers with a respective speaker identifier.

10. The device according to claim 9, wherein the instructions executable by the at least one processor further operate to:
retrieve, for each audio segment of said multiple audio segments and from said database, speaker specific AM parameters associated with said speaker identifier responsive to when said database comprises speaker specific AM parameters associated with said speaker identifier; and
select, for each audio segment of said multiple audio segments, generic AM parameters responsive to when said database does not comprise said speaker specific AM parameters associated with said speaker identifier.

11. The device according to claim 6, wherein the instructions executable by the at least one processor further operate to:
select language model (LM) parameters based on comparison of the speaker domain identifier and the program domain identifier;
adapt, for each audio segment of said multiple audio segments, said ASR model based on said selected LM parameters and said selected AM parameters to form an adapted ASR model; and
transcribe, for each audio segment of said multiple audio segments, said audio segment in said adapted ASR model into a speech transcript.

12. A computer program product for automatic speech recognition, ASR, the computer program product comprising a non-transitory computer readable medium storing instructions, which when executed by at least one processor, cause the at least one processor to:
for each audio segment of multiple audio segments in an audio stream comprising audio data of multiple audio programs, each audio segment comprising speech of a single speaker:
obtain a speaker identifier of a speaker of said audio segment;
determine a program domain identifier based on a media description, wherein the media description could be any information or data element comprising information and metadata of the audio program; and
associate said speaker identifier, said program domain identifier and a speaker domain identifier with said audio segment to enable generation of ASR adaptation parameters based on said speaker identifier, said program domain identifier and said speaker domain identifier,
wherein said speaker domain identifier for said audio segment is based on information or metadata associated with an audio program of said multiple audio programs and said audio segment comprises audio data of said audio program.

13. The computer program product according to claim 12, wherein the instructions executable by the at least one processor further operate to:
retrieve, based on said speaker identifier, acoustic mode (AM) parameters from a database storing speaker specific AM parameters for different speakers with a respective speaker identifier.

14. The computer program product according to claim 13, wherein the instruction executable by the at least one processor to retrieve said AM parameters comprises:
retrieve, from said database, speaker specific AM parameters associated with said speaker identifier responsive to when said database comprises speaker specific AM parameters associated with said speaker identifier; and otherwise select generic AM parameters.

15. The computer program product according to claim 14, wherein the instructions executable by the at least one processor further operate to:
retrieve, for each audio segment of said multiple audio segments and from said database, speaker specific AM parameters associated with said speaker identifier responsive to when said database comprises speaker specific AM parameters associated with said speaker identifier; and
select, for each audio segment of said multiple audio segments, generic AM parameters responsive to when said database does not comprise said speaker specific AM parameters associated with said speaker identifier.

16. The computer program product according to claim 12, wherein the instructions executable by the at least one processor further operate to:
select language model (LM) parameters based on comparison of the speaker domain identifier and the program domain identifier;
adapt, for each audio segment of said multiple audio segments, said ASR model based on said selected LM parameters to form an adapted ASR model; and
transcribe, for each audio segment of said multiple audio segments, said audio segment in said adapted ASR model into a speech transcript.

17. The computer program product according to claim 12, wherein the instructions executable by the at least one processor further operate to:
retrieve, for each audio segment of said multiple audio segments and from said database and responsive to when said speaker domain identifier is equal to said program domain identifier of said audio program, speaker specific language model (LM) parameters associated with said speaker identifier responsive to when a database comprises said speaker specific LM parameters;
retrieve, for each audio segment of said multiple audio segments and responsive to when said speaker domain identifier is equal to said program domain identifier of said audio program, domain specific LM parameters associated with said speaker domain identifier responsive to when said database does not comprise said speaker specific LM parameters; and
select, for each audio segment of said multiple audio segments and responsive to when said speaker domain identifier is not equal to said program domain identifier of said audio program, generic LM parameters.

18. The computer program product according to claim 12, wherein the instructions executable by the at least one processor further operate to select, for each audio segment of said multiple audio segments, acoustic mode (AM) parameters based on said speaker identifier.

19. The computer program product according to claim 12, wherein the instructions executable by the at least one processor further operate to retrieve, for each audio segment of said multiple audio segments and based on said speaker identifier, acoustic mode (AM) parameters from a database storing speaker specific AM parameters for different speakers with a respective speaker identifier.

20. The computer program product according to claim 19, wherein the instructions executable by the at least one processor further operate to:
retrieve, for each audio segment of said multiple audio segments and from said database, speaker specific AM parameters associated with said speaker identifier responsive to when said database comprises speaker specific AM parameters associated with said speaker identifier; and select, for each audio segment of said multiple audio segments, generic AM parameters responsive to when said database does not comprise said speaker specific AM parameters associated with said speaker identifier.

21. The computer program product according to claim 12, wherein the instructions executable by the at least one processor further operate to:

select language model (LM) parameters based on comparison of the speaker domain identifier and the program domain identifier;

adapt, for each audio segment of said multiple audio segments, said ASR model based on said selected LM parameters and said selected AM parameters to form an adapted ASR model; and transcribe, for each audio segment of said multiple audio segments, said audio segment in said adapted ASR model into a speech transcript.

* * * * *